United States Patent
Latta

(10) Patent No.: US 8,688,879 B2
(45) Date of Patent: *Apr. 1, 2014

(54) MEMORY INTERFACE AND METHOD OF INTERFACING BETWEEN FUNCTIONAL ENTITIES

(75) Inventor: David Latta, Knebworth (GB)

(73) Assignee: Synopsys, Inc., Mountain View, CA (US)

(*) Notice: Subject to any disclaimer, the term of this patent is extended or adjusted under 35 U.S.C. 154(b) by 898 days.

This patent is subject to a terminal disclaimer.

(21) Appl. No.: 12/143,351

(22) Filed: Jun. 20, 2008

(65) Prior Publication Data

US 2009/0055565 A1 Feb. 26, 2009

Related U.S. Application Data

(63) Continuation of application No. 11/331,643, filed on Jan. 14, 2006, now abandoned, which is a continuation of application No. 09/801,241, filed on Mar. 7, 2001, now Pat. No. 6,988,154.

(60) Provisional application No. 60/188,546, filed on Mar. 10, 2000.

(51) Int. Cl.
*G06F 12/00* (2006.01)

(52) U.S. Cl.
USPC ............ 710/240; 710/305; 710/316; 710/317

(58) Field of Classification Search
USPC .................. 710/240, 305, 316–317
See application file for complete search history.

(56) References Cited

U.S. PATENT DOCUMENTS

| 4,611,278 A | 9/1986 | Boothroyd et al. |
| 4,639,886 A | 1/1987 | Hashimoto et al. |
| 4,701,860 A | 10/1987 | Mader |
| 4,755,966 A | 7/1988 | Lee et al. |
| 4,763,242 A | 8/1988 | Lee et al. |
| 4,890,218 A | 12/1989 | Bram |

(Continued)

FOREIGN PATENT DOCUMENTS

| EP | 0352103 A | 1/1990 |
| EP | 0355069 A2 | 2/1990 |

(Continued)

OTHER PUBLICATIONS

"The CoreConnect Bus Architecture," XP-002204519, International Business Machines Corporation, 1999.
"Embedded DRAM for a Reconfiguarable Array," XP-000894790, Symposium on VLSI Circuits Digest of Technical Papers.
"A Scalable Architecture for System-On-Chip Interconnections," XP-002204520, Pierre Guerrier and Alain Greiner, Oct. 12, 1999.
"A Reconfigurable Bus IP for Modular Function Integration," XP-002204520, Neil S. Stollen, Ph.D., P.E. at Infinite Technology Corp, Mar. 22, 1999.
"Configurable and Extensible Processors Change System Design," Ricardo E. Gonzalez, Tensilica, Inc., 1999, pp. 1-23.
"True Application-Specific Embedded Processors Now a Reality for System-on-Chip IC Designs," Feb. 15, 1999, Tensilica Inc.
"Altera and Tensilica Announce the Xtensa Microprocessor Core Now Available for APEX Devices," Sep. 29, 1999, Tensilica Inc.
"Xtensa: A Configurable and Extensible Processor," Gonzalez, R.E., Mar.-Apr. 2000, IEEE Micro, vol. 20, Issue 2, pp. 60-70.

(Continued)

*Primary Examiner* — Brian Misiura
(74) *Attorney, Agent, or Firm* — Fenwick & West LLP

(57) ABSTRACT

A data and signal interface for controlling the transfer of data and signals between a memory array and macro function such as that of a digital signal processor (DSP) core. In one embodiment, the interface comprises a plurality of memory ports which interface with X/Y memory banks, a plurality of function ports, each with a function controller, which interface with DSP functions, a crossbar connecting the memory and function ports, and an arbitration unit for arbitrating memory access by the function ports. The memory interface advantageously allows multiple simultaneous accesses of memory banks via a plurality of macro functions, each access under the control of a parent processor instruction. A standardized protocol used for memory read/write operations is also disclosed.

23 Claims, 15 Drawing Sheets

(56) References Cited

U.S. PATENT DOCUMENTS

| | | |
|---|---|---|
| 4,896,258 A | 1/1990 | Yamaguchi et al. |
| 4,974,155 A | 11/1990 | Dulong et al. |
| 4,992,934 A | 2/1991 | Portanova et al. |
| 5,019,967 A | 5/1991 | Wheeler |
| 5,081,575 A | 1/1992 | Hiller et al. |
| 5,226,125 A | 7/1993 | Balmer et al. |
| 5,247,637 A | 9/1993 | Leedom et al. |
| 5,333,176 A | 7/1994 | Burke et al. |
| 5,361,373 A | 11/1994 | Gilson |
| 5,371,860 A | 12/1994 | Mura et al. |
| 5,394,515 A | 2/1995 | Lentz et al. |
| 5,404,319 A | 4/1995 | Smith et al. |
| 5,450,586 A | 9/1995 | Kuzara et al. |
| 5,471,592 A | 11/1995 | Gove et al. |
| 5,481,707 A | 1/1996 | Murphy, Jr. et al. |
| 5,488,730 A | 1/1996 | Brown, III et al. |
| 5,491,640 A | 2/1996 | Sharma et al. |
| 5,493,508 A | 2/1996 | Dangelo et al. |
| 5,493,687 A | 2/1996 | Garg et al. |
| 5,502,661 A | 3/1996 | Glunz |
| 5,509,129 A | 4/1996 | Balmer et al. |
| 5,530,965 A | 6/1996 | Kawasaki et al. |
| 5,535,331 A | 7/1996 | Swoboda et al. |
| 5,537,580 A | 7/1996 | Giomi et al. |
| 5,537,604 A | 7/1996 | Baum et al. |
| 5,544,067 A | 8/1996 | Rostoker et al. |
| 5,555,201 A | 9/1996 | Dangelo et al. |
| 5,555,384 A | 9/1996 | Roberts et al. |
| 5,559,951 A | 9/1996 | Lentz et al. |
| 5,559,970 A | 9/1996 | Sharma et al. |
| 5,564,117 A | 10/1996 | Lentz et al. |
| 5,590,294 A | 12/1996 | Mirapuri et al. |
| 5,636,364 A | 6/1997 | Emma et al. |
| 5,680,632 A | 10/1997 | Studor et al. |
| 5,696,913 A | 12/1997 | Gove et al. |
| 5,696,956 A | 12/1997 | Razdan et al. |
| 5,703,789 A | 12/1997 | Beausang et al. |
| 5,724,566 A | 3/1998 | Swoboda et al. |
| 5,748,875 A | 5/1998 | Tzori |
| 5,751,984 A | 5/1998 | Chang et al. |
| 5,752,271 A | 5/1998 | Yung |
| 5,768,445 A * | 6/1998 | Troeller et al. ............... 382/305 |
| 5,768,613 A | 6/1998 | Asghar |
| 5,774,687 A | 6/1998 | Matsui et al. |
| 5,778,208 A | 7/1998 | Eickemeyer et al. |
| 5,784,603 A | 7/1998 | Leung et al. |
| 5,790,824 A * | 8/1998 | Asghar et al. ................ 712/209 |
| 5,801,958 A | 9/1998 | Dangelo et al. |
| 5,809,320 A | 9/1998 | Jain et al. |
| 5,812,416 A | 9/1998 | Gupte et al. |
| 5,819,050 A | 10/1998 | Boehling et al. |
| 5,819,064 A | 10/1998 | Razdan et al. |
| 5,838,984 A | 11/1998 | Nguyen et al. |
| 5,841,663 A | 11/1998 | Sharma et al. |
| 5,848,289 A | 12/1998 | Studor et al. |
| 5,854,929 A | 12/1998 | Van Praet et al. |
| 5,854,930 A | 12/1998 | McLain, Jr. et al. |
| 5,859,975 A | 1/1999 | Brewer et al. |
| 5,867,399 A | 2/1999 | Rostoker et al. |
| 5,867,400 A | 2/1999 | El-Ghoroury et al. |
| 5,870,588 A | 2/1999 | Rompaey et al. |
| 5,872,993 A | 2/1999 | Brown |
| 5,878,240 A | 3/1999 | Tomko |
| 5,898,595 A | 4/1999 | Bair et al. |
| 5,920,711 A | 7/1999 | Seawright et al. |
| 5,960,468 A | 9/1999 | Paluch |
| 5,963,454 A | 10/1999 | Dockser et al. |
| 5,968,114 A | 10/1999 | Wentka et al. |
| 5,978,889 A | 11/1999 | Zigras |
| 5,987,574 A | 11/1999 | Paluch |
| 5,994,892 A | 11/1999 | Turino et al. |
| 5,995,736 A | 11/1999 | Aleksic et al. |
| 5,999,734 A | 12/1999 | Willis et al. |
| 6,006,022 A | 12/1999 | Rhim et al. |
| 6,016,543 A | 1/2000 | Suzuki et al. |
| 6,026,219 A | 2/2000 | Miller et al. |
| 6,035,123 A | 3/2000 | Razdan et al. |
| 6,038,646 A | 3/2000 | Sproull |
| 6,070,003 A | 5/2000 | Gove et al. |
| 6,091,431 A | 7/2000 | Saxena et al. |
| 6,092,167 A | 7/2000 | Cheung et al. |
| 6,110,218 A | 8/2000 | Jennings |
| 6,110,223 A | 8/2000 | Southgate et al. |
| 6,125,429 A | 9/2000 | Goodwin et al. |
| 6,141,739 A | 10/2000 | Provence et al. |
| 6,173,434 B1 | 1/2001 | Wirthlin et al. |
| 6,182,192 B1 | 1/2001 | Rovati |
| 6,182,206 B1 | 1/2001 | Baxter |
| 6,195,593 B1 | 2/2001 | Nguyen |
| 6,226,776 B1 | 5/2001 | Panchul et al. |
| 6,226,780 B1 | 5/2001 | Bahra et al. |
| 6,240,492 B1 | 5/2001 | Foster et al. |
| 6,256,729 B1 | 7/2001 | Cherabuddi et al. |
| 6,269,467 B1 | 7/2001 | Chang et al. |
| 6,317,860 B1 | 11/2001 | Heile |
| 6,321,369 B1 | 11/2001 | Heile et al. |
| 6,324,678 B1 | 11/2001 | Dangelo et al. |
| 6,330,684 B1 | 12/2001 | Yamanaka et al. |
| 6,338,136 B1 | 1/2002 | Col et al. |
| 6,356,995 B2 * | 3/2002 | Chen ........................... 712/209 |
| 6,360,350 B1 | 3/2002 | Gabele et al. |
| 6,378,123 B1 | 4/2002 | Dupenloup |
| 6,385,757 B1 | 5/2002 | Gupta et al. |
| 6,408,428 B1 | 6/2002 | Schlansker et al. |
| 6,421,818 B1 | 7/2002 | Dupenloup et al. |
| 6,446,181 B1 | 9/2002 | Ramagopal et al. |
| 6,457,173 B1 | 9/2002 | Gupta et al. |
| 6,463,514 B1 | 10/2002 | Ray et al. |
| 6,477,683 B1 | 11/2002 | Killian et al. |
| 6,477,697 B1 | 11/2002 | Killian et al. |
| 6,519,672 B2 | 2/2003 | Scardamalia et al. |
| 6,539,522 B1 | 3/2003 | Devins et al. |
| 6,560,754 B1 | 5/2003 | Hakewill et al. |
| 6,564,042 B1 | 5/2003 | Jou et al. |
| 6,574,787 B1 | 6/2003 | Anderson |
| 6,581,191 B1 | 6/2003 | Schubert et al. |
| 6,628,662 B1 | 9/2003 | Blackmon et al. |
| 6,637,018 B1 | 10/2003 | Demler |
| 6,671,743 B1 | 12/2003 | Verity |
| 6,701,515 B1 | 3/2004 | Wilson et al. |
| 6,760,888 B2 | 7/2004 | Killian et al. |
| 6,763,327 B1 | 7/2004 | Songer et al. |
| 6,862,563 B1 | 3/2005 | Hakewill et al. |
| 6,988,154 B2 | 1/2006 | Latta et al. |
| 7,010,558 B2 | 3/2006 | Morris |
| 7,036,106 B1 | 4/2006 | Wang et al. |
| 7,139,893 B2 | 11/2006 | Hang |
| 7,181,596 B2 | 2/2007 | Henry et al. |
| 2001/0051766 A1 | 12/2001 | Gazdzinski |
| 2002/0073375 A1 | 6/2002 | Hollander |
| 2003/0009612 A1 | 1/2003 | Latta |
| 2003/0208723 A1 | 11/2003 | Killian et al. |
| 2006/0174081 A1 | 8/2006 | Latta |
| 2006/0236300 A1 | 10/2006 | Lajolo et al. |

FOREIGN PATENT DOCUMENTS

| | | |
|---|---|---|
| EP | 0365188 A2 | 4/1990 |
| EP | 0476628 A2 | 3/1992 |
| EP | 0 479 390 | 4/1992 |
| EP | 0489266 A2 | 6/1992 |
| EP | 0649085 A | 4/1995 |
| EP | 0871108 A1 | 10/1998 |
| GB | 2308470 A | 6/1997 |
| GB | 2309803 | 8/1997 |
| GB | 2330673 A | 4/1999 |
| JP | 08339326 | 12/1996 |
| WO | WO 97/13209 A1 | 4/1997 |
| WO | WO 00/70446 A2 | 11/2000 |
| WO | WO 00/70483 A2 | 11/2000 |

(56) References Cited

FOREIGN PATENT DOCUMENTS

OTHER PUBLICATIONS

"A VLSI Processor-Switch for a Dual IEEE-796 Bus with Shared and Dual-Port Memories," Opsommer, Jr., et al, May 8-12, 1989, IEEE, CompEuro '89, VLSI and Microelectronic Applications in Intelligent Peripherals, Proceedings, p. 4/146-4/149.
"A High-Performance Switching Element for a Multistage Interconnection Network," Aude, J.S., et al, Sep. 30-Oct. 3, 1998, IEEE, XI Brazilian Symposium on Integrated Circuit Design, 1998, Proceedings, pp. 154-157.
"Bus Arbitration in an Embedded Processor-Shared Multiprocessor System," Ramesh, T., et al, Aug. 16-18, 1993, IEEE, Proceedings of the 36th Midwest Sumposium on Circuits and Systems, vol. 1, pp. 320-322.
"Design of a Chip Set for a Parallel Computer Based on the Crossbar Interconnection Principle," Bos, M.L., Aug. 13-16, 1995, IEEE, Proceedings of the 38th Midwest Sumposium on Circuits and Systems, vol. 2, pp. 752-756.
Hardware Description Languge—retrieved from: http://en.wikipedia.org/wiki/Hardware_descripton_language on Jul. 5, 2007—7 pages.
3G—retrieved from : http://en.wikipedia.org/wiki/3G on Jul. 6, 2007—7 pages.
Viterbi algorithm—retrieved from : http://en.wikipedia.org/wiki/Viterbi_algorithm on Jul. 9, 2007—6 pages.
3DSP, "Implementation of a 3GPP Turbo Decoder on a programmable DSP Core", retrieved from : http://www.3dsp.com/pdf/3dspTurboWhite Paper.pdf on Jul. 9, 2007—7 pages.
DSP/Coprocessor Combos Streamline 3G Basestations—retrieved from : http://www.commsdesign.com/showArticle.jhtmk;jsessionid= ZW2HF1NDQPQ4KQ SNDLRCKHOCK JUNN2JVN?articleID=16504220, retrieved on Jul. 9, 2007—9 pages.
HW Communications Ltd. Convolutional Decoding for Reconfigurable Mobile Systems, D. Lund, V. Barekos, B. Honary—retrieved on Jul. 9, 2007—5 pages.
U.S. Appl. No. 09/418,663 entitled "Method and Apparatus for Managing the Configuration and Functionality of a Semiconductor Design" filed Oct. 14, 1999.
U.S. Appl. No. 09/523,871 entitled "Method and Apparatus for Jump Control in a Pipelined Processor," filed Mar. 13, 2000.
U.S. Appl. No. 09/523,877 entitled "Method and Apparatus for Jump Delay Slot Control in a Pipelined Processor," filed Mar. 13, 2000.
"ARC Wins Key U.S. Patent," Microprocessor Report, Mar. 2005, pp. 19-20, vol. 19, Archive 3.
"The ARCtangent™—A5 Processor," ARC International, 2002, 4 pages.
Baron, M. "ARM's Configurable OptimoDE," Microprocessor Report, Jun. 2004, pp. 10-14, vol. 18, Archive 6.
Berekovic, M. et al., A Core Generator for Fully Synthesizable and Highly Parameterizable RISC Cores for System On-Chip Designs, 1998 IEEE Workshop on Signal Processing Systems, pp. 561-568, XP-002137267.
Cambell et al, "A tutorial for make", Proceedings of the 1985 ACM annual conference on the range of computing; mid-80's perspective, 1985, Denver, Colorado, United States, pp. 374-380. ISBN 0-89791-170-9.
Chinese First Office Action, Chinese Application No. 00808460.2, Jun. 27, 2003, 15 pages.
Chinese First Office Action, Chinese Application No. 00808458.0, Jun. 11, 2004, 11 pages.
Chinese Third Office Action, Chinese Application No. 200510084318.3, Jan. 4, 2008, 6 pages.
Chinese Second Office Action, Chinese Application No. 200510084318.3, Sep. 7, 2007, 6 pages.
Chinese First Office Action, Chinese Application No. 200510084318.3, Jan. 26, 2007, 9 pages.
Chinese First Office Action, Chinese Application No. 00808462.9, Jan. 2, 2003, 11 pages.
Chinese First Office Action, Chinese Application No. 200510053551.5, Nov. 17, 2006, 15 pages.
Chinese First Office Action, Chinese Application No. 00808459.9, Jul. 25, 2003, 16 pages.
Chinese Second Office Action, Chinese Application No. 00808459.9, Jan. 16, 2004, 13 pages.
Clucas, R., "Designing with a Customisable Miscroprocessor Core," Electronic Eng'g, vol. 71, No. 865, Feb. 1, 1999, p. 35.
Compton et al. "Configurable Computing: A Survey of Systems and Software," Technical Report, Northwestern Universily, Dept. of ECE. 1999.
"Condition Register Coherency Look-Ahead," Research Disclosure (1993), No. 348, Apr. 1993, p. 243, XP000304185.
Diefendorff, K. et al., "Organization of the Motorola 88110 Superscalar RISC Microprocessor," IEEE Micro, Apr. 1992, pp. 40-63, vol. 12, No. 2.
Ditzel, D.R., et al., "Branch Folding in the CRISP Microprocessor: Reducing Branch Delay to Zero," 14th Annual International Symposium on Computer Architecture, Jun. 2-5, 1987, pp. 2-8, XP000212073.
"Earlier Configurable Processors: Close, But No Cigar," Microprocessor Report, Dec. 2002, pp. 8-10, vol. 16, Archive 12.
Elms, A., Tuning a Customisable RISC Core for DSP; Electronic Product Design, Sep. 1997, vol. 18, No. 9, 5 pages.
Elms, A., Tuning a Customisable RISC Core for DSP; Electronic Product Design, Sep. 1997, vol. 18, No. 9, pp. 19-20, 22, XP000909039.
European Decision to Refuse a European Patent Application, European Patent Application No. 99958445.1, Dec. 23, 2005, 9 pages.
European Provision of the Minutes in Accordance with Rule 76(4) EPC, European Patent Application No. 99958445.1, Dec. 23, 2005, 7 pages.
European Summons to Attend Oral Proceedings Pursuant to Rule 71(1) EPC, European Application No. 99958445.1, May 18, 2005, 5 pages.
European Examination Report, European Application No. 99958445.1, Jul. 21, 2004, 8 pages.
European Examination Report, European Application No. 99958445.1, Mar. 12, 2002, 6 pages.
European Examination Report, European Application No. 00930715.8, Feb. 9, 2007, 5 pages.
European Examination Report, European Application No. 00930715.8, Oct. 7, 2005, 5 pages.
European Examination Report, European Application No. 00930715.8, Mar. 25, 2004, 4 pages.
European Examination Report, European Application No. 00930715.8, Jul. 11, 2002, 6 pages.
European Examination Report, European Application No. 00930707.5, Dec. 6, 2006, 7 pages.
European Examination Report, European Application No. 00930707.5, Mar. 11, 2005, 8 pages.
European Examination Report, European Application No. 00930707.5, Oct. 28, 2003, 4 pages.
European Examination Report, European Application No. 00930707.5, Mar. 17, 2003, 8 pages.
European Examination Report, European Application No. 00930707.5, Oct. 22, 2002, 4 pages.
European Examination Report, European Application No. 00928970.3, Jun. 14, 2002, 3 pages.
Fauth et al. "Describing Instruction Set Processors Using nML" (Proc. Euro. Design & Test Conf., Paris, Mar. 1995, IEEE 1995, 5 pp.
Fisher, J. et al., "Custom-Fit Processors: Letting Applications Define Architectures", IEEE, 1996, 32 pages.
Freericks "The nML Machine Description Formalism" Bericht 1991/15, pp. 3-41).
Hadjiyiannis, G. et al., ISDL: An Instruction Set Description Language for Retargetability, DAC '97, ACM. 1997, 4 pages.
Halfhill, T.R., "Altera's New CPU for FPGAs" Microprocessor Report, Jun. 2004, pp. 15-20.
Halfhill, T.R. et al., "ARC Patent Looks Formidable," Microprocessor Report, Aug. 2005, pp. 3-11, vol. 19, Archive 8.
Halfhill, T.R., "ARC's Preconfigured Cores," Microprocessor Report, Mar. 2005, pp. 15-20, vol. 19, Archive 3.

(56) References Cited

OTHER PUBLICATIONS

Halfhill, T.R., "Busy Bees at Silicon Hive" Microprocessor Report, Jun. 2005, pp. 17-20, vol. 19, Archive 6.
Halfhill, T.R., "MIPS Embraces Configurable Technology" Microprocessor Report, Mar. 2003, pp. 7-15, vol. 17, Archive 3.
Halfhill, T.R., "Tensilica Patent Challenged," Microprocessor Report, Jun. 2003, p. 4, vol. 17, Archive 6.
Halfhill, T.R. et al., "Tensilica Patents Raise Eyebrows," Microprocessor Report, Dec. 2002, pp. 1, 7-10, vol. 16, Archive 12.
Halfhill, T.R., "Tensilica's Automaton Arrives," Microprocessor Report, Jul. 2004, pp. 22-26.
Halfhill, T.R., "Tensilica Patents Raise Eyebrows" MDR—Microprocessor Report, dated Dec. 9, 2002, 6 pages.
Hartoog et al., "Generation of Software Tools from Processor Descriptions for Hardware/Software Codesign," ACM, Jun. 1997, pp. 303-306.
Hauk et al., "The Chimaera Reconfigurable Functional Unit." Proceedings of the IEEE Symposium on Field-Programmable Custom Computing Machines, 1997, pp. 87-96.
"HDL Chip Design" by Douglas J. Smith, Ninth printing Jul. 2001, minor updates. First Printing Jun. 1996. Doone Publications. ISBN 0-9651934-3-8. pp. 1-25.
Helbig, W. et al., "A DCFL E/D MESFET GaAS Experimental RISC Machine," IEEE Transactions on Computers, Feb. 1989, pp. 263-274, vol. 38, No. 2.
Hennessy & Patterson, Computer Architecture A Quantitative Approach, 2nd Edition, Morgan Kaufmann Publishers, Inc. 1996, pp. 70-71 & 132, Chapter 2, Chapter 3, Sections 3.1-3.2, and Chapter 6, Sections 6.1 and 6.2.
Heuring, V.P. et al., "Computer Systems Design and Architecture," Menlo Park, CA: Addison Wesley Longman, Inc. 1997, pp. 38-40.
Hogl, H. et al., "Enable + +: A General-Purpose L2 Trigger Processor," Nuclear Science Symp. & Medical Imaging Conf., vol. 2, Oct. 21-28, 1995, pp. 667-671.
Indian Office Action, Indian Application No. IN/PCT/2001/00420, Apr. 6, 2005, 1 page.
Indian Office Action, Indian Application No. IN/PCT/2001/00420, Jun. 24, 2005, 1 page.
Indian Office Action, Indian Application No. IN/PCT/2001/00420, Jan. 2005, 1 page.
InstantWeb. Free Online Computing Dictionary (FOLDOC), 1997, Search term: RISC, <http://www.instantweb.com/foldoc/foldoc.cgi?query=RISC>.
Intel Architecture Software Developer's Manual vol. 2: Instruction Set Reference, Intel Corporation, 1997, Chapters 1, 2, 3, Section 3.1, pp. 3-416 to 4-419 and 3-429.
Intel Pentium® Processor Family Developer's Manual vol. 3: Architecture and Programming Manual, Mt. Prospect, IL, Intel Corporation, 1996, pp. 3-4, 3-13, 2527, 25-31, 25-280.
Internet Publication http://www.retarget.com/brfchschk.html, Last Updated Sep. 10, 1998, Target Compiler Technologies N.V., [Retrieved on Jan. 24, 1999], 19 pages.
Internet Publication http://www.synopsys.com/products/designware/8051_ds.html, 1998, Synopsys, Inc., [Retrieved on Nov. 7, 1998], 8 pages.
Internet Publication http://www.synopsys.com/products/designware/dwpci_ds.html, 1998, Synopsys, Inc., [Retrieved on Nov. 7, 1998], 16 pages.
Internet Publication http://www.lexra.com/product.html, No date, Lexra, Inc., [Retrieved on Nov. 7, 1998], 11 pages.
Internet Publication http://www.risccores.com/html/body_aboutarc.htm, No date, Argonaut RISC Cores, [Retrieved on Nov. 7, 1998], 13 pages.
Israel Notification Prior to Examination of Patent Application No. 170671, Jun. 4, 2007, 1 page.
Israel Official Notification Under Section 18 of the Law, Israel Patent Application No. 142342, Jun. 7, 2012, 4 pages.
Israel Office Action, Israel Patent Application No. 142342, May 29, 2005, 4 pages.
Korean Office Action, Korean Application No. 10-2001-7004710, Apr. 28, 2006, 5 pages.
Korean Office Action, Korean Application No. 10-2001-7004710, Oct. 26, 2007, 12 pages.
Korean Notice of Amendment, Korean Application No. 10-2001-7004710, Jun. 13, 2001, 2 pages.
Leupers, R. et al., Retargetable Code Generation based on Structural Processor Descriptions, Design Automation for Embedded Systems, vol. 3, No. 1, Jan. 1998, p. 1-36.
Mano, M. M. et al., "Logic and Computer Design Fundamentals," 2$^{nd}$ Edition Updated, Upper Saddle River, New Jersey: Prentice Hall, 1997, pp. xiii-xiv and 97-98.
May, D. et al., "The Transputer," Proceedings of the NATO Advanced Workshop on Neural Computers, Berlin, DE, Sep. 28-Oct. 2, 1987, pp. 477-486.
Merriam-Webster Online Dictionary, Search Term: Integrate, Merriam-Webster, Inc., 2005.
Patel, P. et al., "Architectural Features of the i860—Microprocessor RISC Core and On:Chip Caches," Proceedings of the International Conference on Computer Design: VLSI in Computers and Processors, IEEE Comp. Soc. Press, 1989, pp. 385-390.
Patterson, D.A. et al., "Computer Architecture: A Quantitative Approach," San Mateo, CA: Morgan Kaufmann Publishers, Inc., 1990, pp. 252-278.
PCT International Search Report, PCT Application No. PCT/IB99/02030, May 22, 2000, 3 pages.
PCT International Preliminary Examination Report, PCT Application No. PCT/IB99/02030, Jan. 8, 2001, 5 pages.
PCT International Search Report, PCT Application No. PCT/US00/13233, Feb. 27, 2001, 9 pages.
PCT International Preliminary Examination Report, PCT Application No. PCT/US00/13233, Jul. 31, 2001, 12 pages.
PCT International Search Report, PCT Application No. PCT/US00/13221, Feb. 27, 2001, 7 pages.
PCT International Preliminary Examination Report, PCT Application No. PCT/US00/13221, Aug. 17, 2001, 18 pages.
PCT International Search Report, PCT Application No. PCT/US00/13198, Nov. 5, 2001, 7 pages.
PCT International Preliminary Examination Report, PCT Application No. PCT/US00/13198, Jun. 3, 2002, 12 pages.
PCT International Search Report, PCT Application No. PCT/US00/13030, Feb. 27, 2001, 6 pages.
PCT International Preliminary Examination Report, PCT Application No. PCT/US00/13030, Aug. 10, 2001, 13 pages.
Razdan et al., "A High-Performance Microarchitecture with Hardware-Programmable Function Units," Proceedings of MICRO-27, Nov. 1997, 13 pages.
Rosenberg, J.M., "Dictionary of Computers, Information Processing, and Telecommunications," Second Edition, New York: John Wiley & Sons, 1987, p. 419.
Tensilica, Inc; Xtensa Instruction Set Architecture (ISA) Reference Manual Revision 1.0. (First 25 pages).
Tensilica, Inc. Instruction Extension Language (TIE) Reference Manual Revision 1.3, 1988-1999, 53 pages.
VAX MACRO and Instruction Set Reference Manual, Digital Equipment Corporation, 1996, [Online] Retrieved from the Internet<URL:http://tigger.stcloudstate.edu/~tigger/openvms/72final/4515/4515pro.html#first_page>.
Wang et al., "Hardware/Software Instruction Set Configurability for System-on-Chip Processors," Proceedings of Design Automation Conference, 2001, pp. 184-188.
Warren, H.S., "Instruction Scheduling for the IBM RISC System/6000 Processor," IBM Journal of Research and Development, vol. 34, No. 1, 1990, pp. 85-92, XP000128183.
Wirthlin et al., "The Nano Processor: a Low Resource Reconfigurable Processor," IEEE Workshop on FPGAs for Custom Computing Machines, Napa, CA, Apr. 11, 1994, pp. 23-30.
Wollan, V., "A Design Methodology Achieving Fast Development Cycles for Complex VLSI Architectures," Proc. on the European Conf. on Design Automation, Feb. 22-Mar. 25, 1993, pp. 532-535.

(56) References Cited

OTHER PUBLICATIONS www.dictionary.com; search terms: processor, computer, instruction.
Yang, Jin-Hyuk, et al. "MetaCore: A Configurable & Instruction-Level Extensible DSP Core." Proceedings of the ASP-DAC '98 Asian and South Pacific Design Automation Conference 1998, Feb. 1998, pp. 325-326, XP-OO2137268.
Zavojnovic, V. et al., DSP Processor/Complier Co-Design A Quantitative Approach, Integrated Systems for Signal Processing, Aachen University Technology, p. 761-765, 1998.

* cited by examiner

|        | Data Block 0 | Data Block 1 | Data Block 2 | Data Block 3 | Data Block 4 | ... |
|--------|--------------|--------------|--------------|--------------|--------------|-----|
| Bank 0 | Function 0   | Function 1   | Function 2   | Function 3   | Function 0   |     |
| Bank 1 | -            | Function 0   | Function 1   | Function 2   | Function 3   |     |
| Bank 2 | -            | -            | Function 0   | Function 1   | Function 2   |     |
| Bank 3 | -            | -            | -            | Function 0   | Function 1   |     |

FIG. 9a

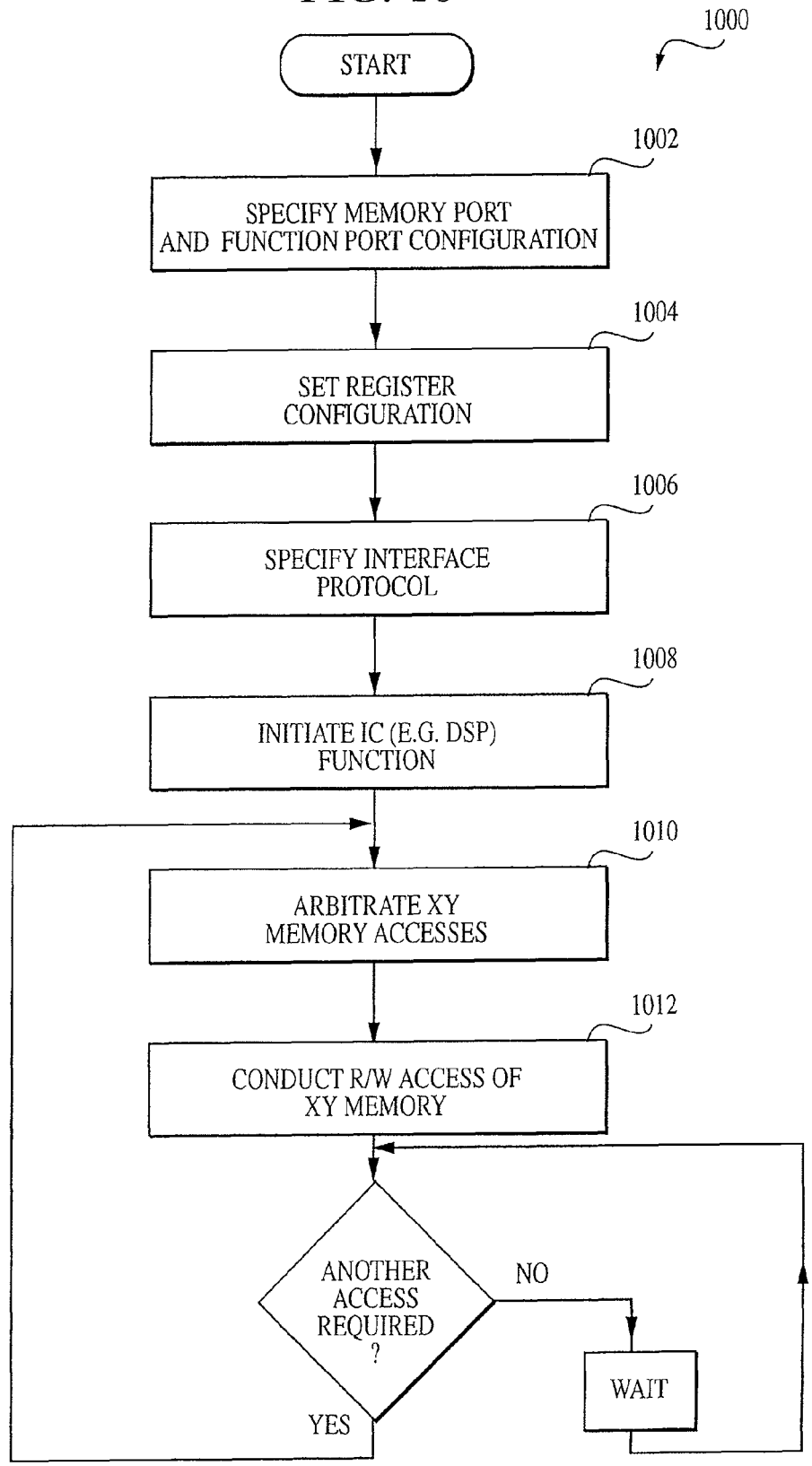

MEMORY INTERFACE AND METHOD OF INTERFACING BETWEEN FUNCTIONAL ENTITIES

PRIORITY

This application claims priority benefit to U.S. provisional patent application Ser. No. 60/188,546 filed Mar. 10, 2000 and entitled "Memory Interface and Method of Interfacing Between Integrated Circuits."

RELATED APPLICATIONS

This application is related to pending U.S. patent application Ser. No. 09/418,663 filed Oct. 14, 1999 entitled "Method and Apparatus for Managing the Configuration and Functionality of a Semi-Conductor Design", which claims priority benefit of U.S. provisional patent application Ser. No. 60/104,271 filed Oct. 14, 1998, of the same title.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the field of integrated circuit design, specifically to the integration of peripheral components and macro functions with a central processing unit (CPU) or user-customizable microprocessor.

2. Description of Related Technology

As semiconductor processing capabilities increase the number of transistors that can be economically built on a single Integrated Circuit (IC), systems designers are made less effective by the difficulty encountered in combining large-scale macro blocks on a single IC. Such large-scale macro blocks (or "macro functions") include, for example, those associated with third generation ("3G") communications architectures, such as functions performing Viterbi butterfly decode, cyclic redundancy checks (CRC), convolutional encoding/decoding, permutation, and carrier modulation/demodulation. Some of the problems encountered by the designer are underscored by the need to integrate special purpose functions with an existing instruction set implemented by a given central processing unit (CPU). Often, a non-integrated design approach is employed, wherein the large-scale macro blocks or functions are treated as separate entities from the processor core, thereby requiring additional complexity, as well as specialized or unique interfaces between the core and its associated functions which are not standardized across the device. Specifically, with respect to memory interfaces, the use of control registers associated with the memory ports of the interface not only complicates the design, but also may under certain circumstances limit or restrict the functionality of the interface. For example, individual macro blocks associated with the design may be precluded from acting on data in separate memory banks simultaneously, thereby hindering the performance of the design as a whole by requiring that memory accesses be performed in "lock-step" fashion.

Prior art treatment of large-scale macro functions as separate entities within the design has further disabilities relating to memory. In particular, since the macro block is effectively a separate entity from the core, memory interfaces to existing core memory are often quite complex, thereby often necessitating the provision of separate memory dedicated to the macro function (or shared between multiple macro functions). The requirement for such additional memory adds cost and complexity to the device, as well as monopolizing already precious real estate on the die. This is especially true for so-called "system-on-a-chip" (SoC) designs, where available memory is often a limiting parameter. Additionally, such dedicated "off-core" memory is by definition not local to the core, and hence results in increased latency when such memory must be accessed by the core.

Furthermore, as more such large-scale macro function blocks are added to the design, the propensity for such increased complexity and non-standardization across the design increases accordingly.

Furthermore, conventional interface mechanisms are typically based on a common bus, and transfers between peripherals and the core(s) are arbitrated by one or more direct memory access (DMA) controllers. However, under such an approach, the timed transfer of data may not be deterministic, which is often a crucial requirement for DSP applications. Specifically, DSP systems often require not only that data are processed correctly mathematically, but that results are delivered at the right time. In this sense a "deterministic" transfer is one for which the timing is exactly known.

Based on the foregoing, there is a need for an improved apparatus and method for enabling macro functions and peripherals present on an integrated device to interface with the device processor core in a simple and standardized manner. Such improved interface would not only allow for standardized interface between macro-functions across the device, but also allow multiple macros to interface with individual (or a plurality of) memory banks simultaneously. Such improved apparatus and method would also ideally obviate separate or discrete local memory now used in support of macro (e.g., DSP core) functions, and facilitate deterministic transfer of data between functional entities in the design.

SUMMARY OF THE INVENTION

The present invention satisfies the aforementioned needs by an improved apparatus and method for interfacing between integrated circuit devices, such as between a digital processor and associated memory array.

In a first aspect of the invention, an improved interface apparatus useful for interfacing between an external device and one or more processor functions is disclosed. In one exemplary embodiment, the external device comprises a memory array, and the interface comprises a plurality of memory ports, a plurality of function ports with associated function controllers, a crossbar connecting the memory ports to the function ports, and an arbitration unit for arbitrating memory accesses and facilitating burst load/store operations. The interface apparatus enables a macro block to be integrated with the CPU, controlled with a custom processor instruction, and act directly on CPU local memory banks. Other macro blocks can also access data in other banks simultaneously. Under CPU control, blocks of data can be acted on by macro functions in a pipelined fashion. The local CPU memory banks therefore replace memory that might otherwise be duplicated in the macro block. Once acquired, data is local to the CPU which can also act on it without unnecessary additional latency.

In a second aspect of the invention, an improved data transfer protocol used in conjunction with the aforementioned interface is disclosed. In one embodiment, the protocol comprises a synchronous protocol using a plurality of registers disposed within the aforementioned functional control units of the function ports. Data exchange with the memory interface is synchronized with the clock of the processor core, and data is strobed in and out of the memory after memory access has been requested and granted. The grant of memory access requests is delayed if the requested memory bank is being accessed for a burst load/store operation, or by the processor core. The protocol of the invention supports, in conjunction with the memory interface, multiple simultaneous strobed accesses to different memory banks by different macro functions (function ports) associated with the interface.

In a third aspect of the invention, an improved data processing apparatus is disclosed. The device generally comprises a processor core, the aforementioned memory interface, at least one macro function, XY memory array, and I/O interface. In one exemplary embodiment, the processor core comprises extensible RISC-based digital processor, and the macro function comprises a digital signal processor (DSP). The DSP may be a general purpose DSP, or alternatively any one of a number of algorithmically optimized designs which are adapted to perform certain data processing tasks. The RISC processor and DSP are tightly coupled such that the DSP and memory interface effectively become part of the RISC processor's instruction set, the macro function (DSP) being controlled by, for example, decoded instructions generated by the pipeline decode stage of the RISC processor. Furthermore, peripheral devices can have direct memory access (DMA) capability with respect to the XY memory array via the I/O interface. The components are also advantageously combined into a single-die integrated circuit device. In another embodiment, the device comprises a "3G" ASIC having a plurality of macro blocks including a signal receiver and demodulator, "turbo" or Viterbi decoder, block cyclic redundancy code (CRC) calculation macro, block permute macro, block convolution encoder macro, and modulator and transmitter, all of which are coupled to the core memory array via the memory interface.

In a fourth aspect of the invention, a method of interfacing between a memory and one or more processor functions is disclosed. In one exemplary embodiment, the method comprises specifying a number of function ports for an interface; specifying a number of memory ports for the interface; setting a number of control and other registers based on the function port configuration; specifying an interface protocol; initiating the function(s) associated with the function port(s); arbitrating one or more memory accesses; and performing read/write access to memory according to the selected protocol and control by the parent processor core.

In a fifth aspect of the invention, a method of testing a function associated with the previously described memory interface is disclosed. In one exemplary embodiment, the method comprises providing a memory interface having at least one memory port and associated memory array, at least one function port and associated function, and at least one control register used for controlling said function; providing a test sequence; providing an input test value in the memory array; initiating the function; generating results from the operation of the function on the input test value; and comparing the results returned by the function against a known value in order to test the operation of the function.

In a sixth aspect of the invention, an improved method of designing an integrated circuit device having an extensible processor core, secondary processor (e.g., DSP) or macro function, and memory interface is disclosed. In one embodiment, the method comprises providing an extensible core; providing at least one macro function; providing at least one memory interface; adding an HDL "wrapper" around the DSP or macro function, the HDL wrapper adapted to (i) translate signals, (ii) buffer memory interfaces, and (iii) synchronize clock signals with the memory interface. In another embodiment, the method comprises providing an extensible core; providing at least one "soft" macro function; providing at least one memory interface as described previously herein; and adapting the "soft" macro function implementation to meet the specification associated with the memory interface.

BRIEF DESCRIPTION OF THE DRAWINGS

FIG. 9a is a logical block diagram illustrating the operation of one exemplary embodiment of the macro function "pipeline" using the memory interface of the present invention.

FIG. 10 is a logical flow diagram illustrating one embodiment of the method of interfacing a function with a memory array according to the invention.

DETAILED DESCRIPTION

Reference is now made to the drawings wherein like numerals refer to like parts throughout.

As used herein, the term "processor" is meant to include any integrated circuit or other electronic device capable of performing an operation on at least one instruction word including, without limitation, extensible reduced instruction set core (RISC) processors such as the ARC™ user-configurable core manufactured by the Assignee hereof, central processing units (CPUs), and digital signal processors (DSPs). Furthermore, various functional aspects of the processor may be implemented solely as software or firmware associated with the processor.

As used herein, the term "parent" processor refers generally to the aforementioned ARC core (or similar), while the term "host" processor refers generally to an external processor which controls the operation of the ARC core and/or other functional aspects of the design.

Additionally, it will be recognized by those of ordinary skill in the art that the term "stage" as used herein refers to various successive stages within a pipelined processor; i.e., stage 1 refers to the first pipelined stage, stage 2 to the second pipelined stage, and so forth.

It is also noted that while portions of the following description are cast in terms of VHSIC hardware description language (VHDL), other hardware description languages such as Verilog® may be used to describe various embodiments of the invention with equal success. Furthermore, while an exemplary Synopsys® synthesis engine such as the Design Compiler 2000.05 (DC00) is used to synthesize the various embodiments set forth herein, other synthesis engines such as Buildgates® available from, inter alia, Cadence Design Systems, Inc., may be used. IEEE std. 1076.3-1997, IEEE Standard VHDL Synthesis Packages, describe an industry-accepted language for specifying a Hardware Definition Language-based design and the synthesis capabilities that may be expected to be available to one of ordinary skill in the art.

Overview

Figure 1:
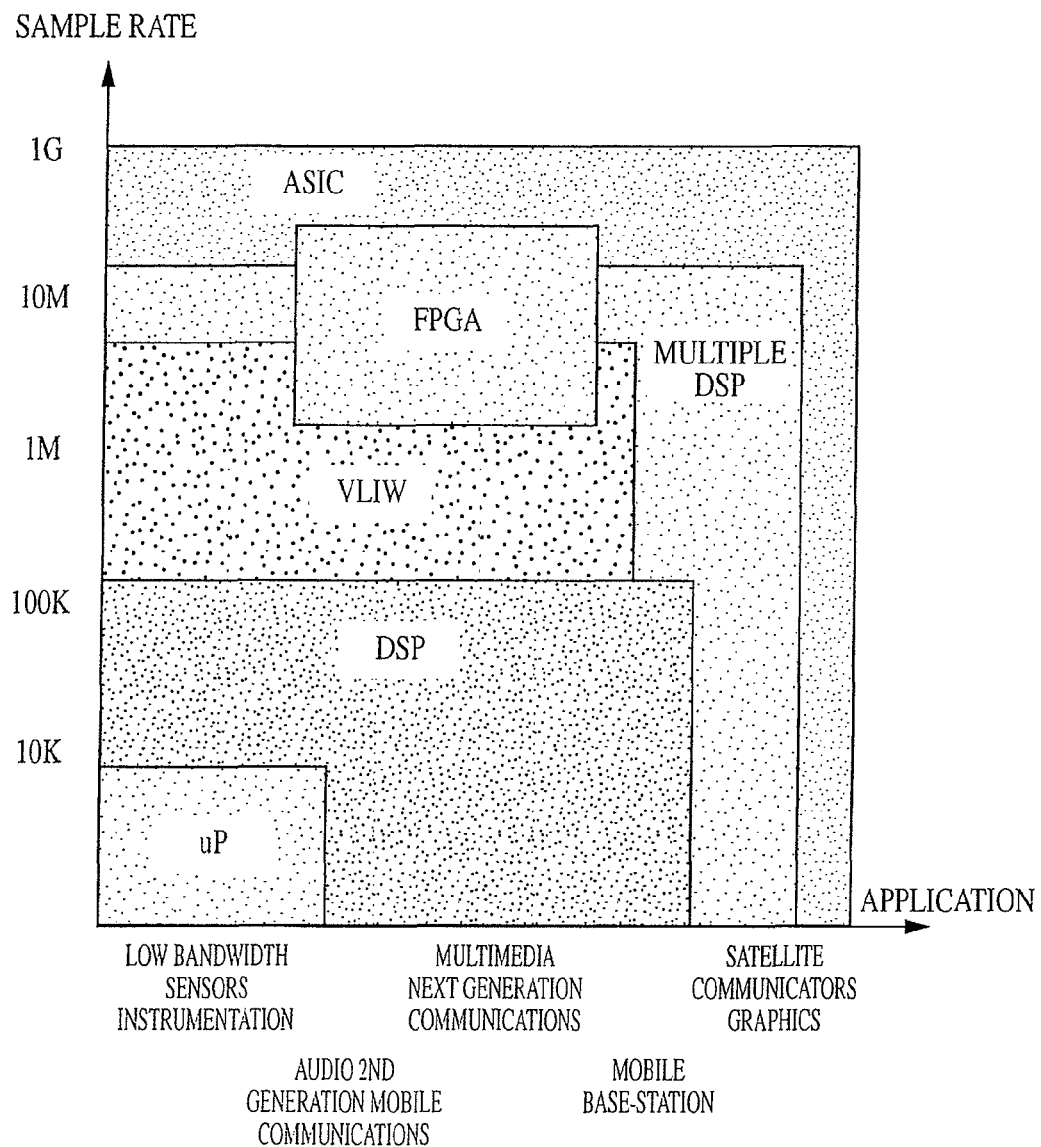
FIG. 1 is a plot of data sample rate versus type of application, illustrating the relationship between various types of processor architectures and their possible applications.

The memory interface of the present invention has been conceived to enable, inter alia, DSP macro functions and peripherals to interface with another processor core using a simple and standard methodology. Close integration with predefined VLSI functions increases the ability to satisfy demanding applications and meet emerging industry standards, such as those relating to so-called "3G" applications. For certain high-speed communications tasks, only custom DSP and input/output (I/O) functions can meet the processing demands. This concept is illustrated in FIG. 1.

The extensible nature of certain processor cores (e.g., the Applicant's "ARC" core) and associated XY memory allow DSP and I/O functions to be tightly coupled for such demanding applications. Using the apparatus and methodology of the present invention, the DSP core(s) effectively become part of the parent processor core instruction set, and I/O peripherals have direct memory access (DMA) to the processor core.

Furthermore, many algorithmically optimized DSP core designs exist. Combining dedicated hardware functional performance and software flexibility within the same IC advantageously provides the most cost effective and shortest time to market for new product development.

Description of Interface

Figure 2:
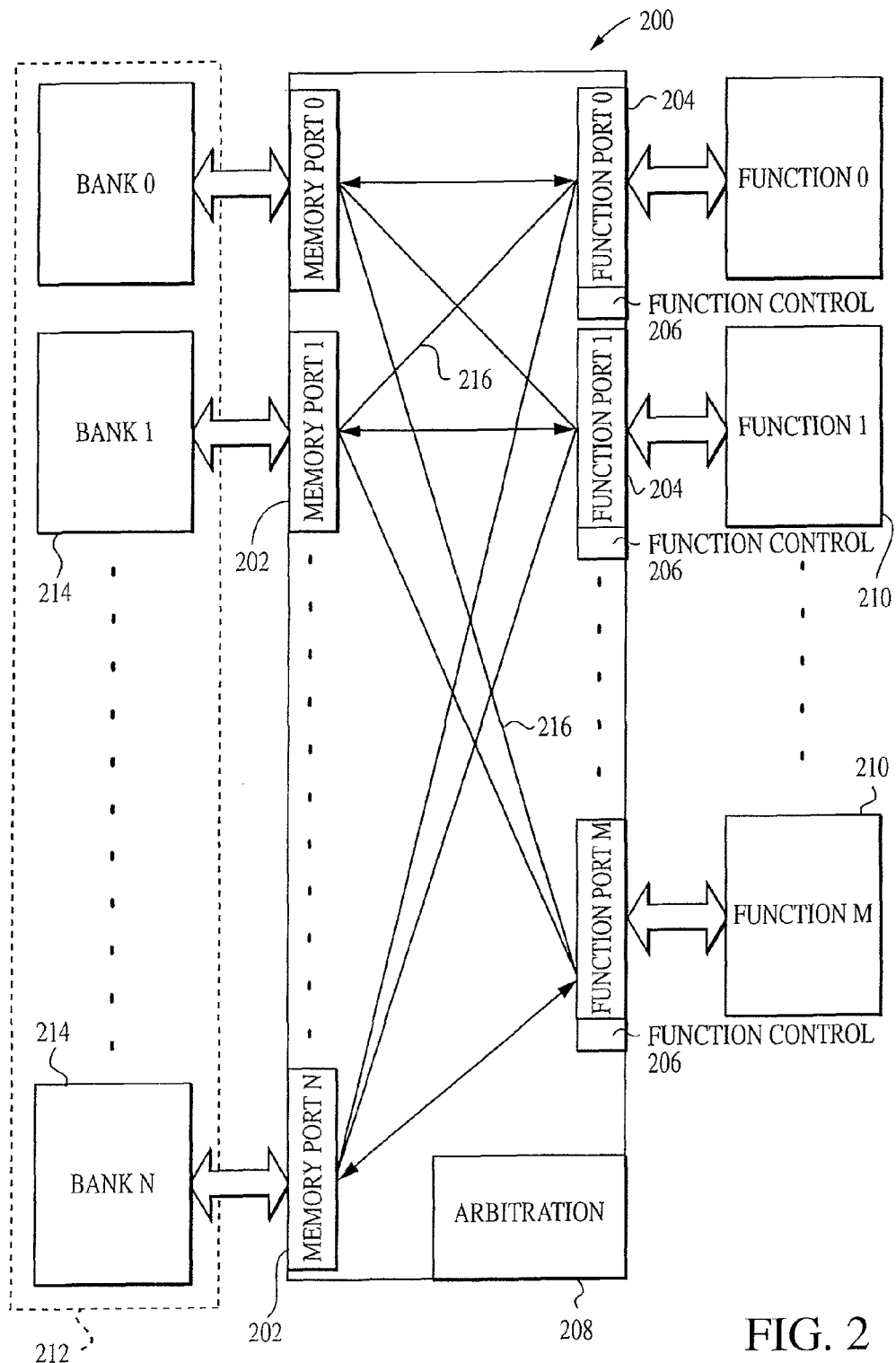
FIG. 2 is a block diagram of one exemplary embodiment of the memory interface according to the present invention.

Referring now to FIG. 2, one exemplary embodiment of the memory interface of the present invention is described. As shown in FIG. 2, the interface 200 comprises generally a plurality of memory ports 202, a plurality of function ports 204, a plurality of function controllers 206 associated with the aforementioned function ports 204, and an arbitration controller 208. The interface 200 is designed to interface between various "macro" functions 210 associated with a logic or processing device typically in the form of an integrated circuit (IC) such as a DSP, microprocessor, or ASIC (hereinafter generally referred to as "IC function"), and a memory array 212 having a plurality of individual memory banks 214. While an interface 200 having a plurality of ports 202, 204 is shown, it will be recognized that the interface device 200 of the present invention may be implemented with any lesser number of ports, such as one memory port 202 and one function port 204.

Figure 6:
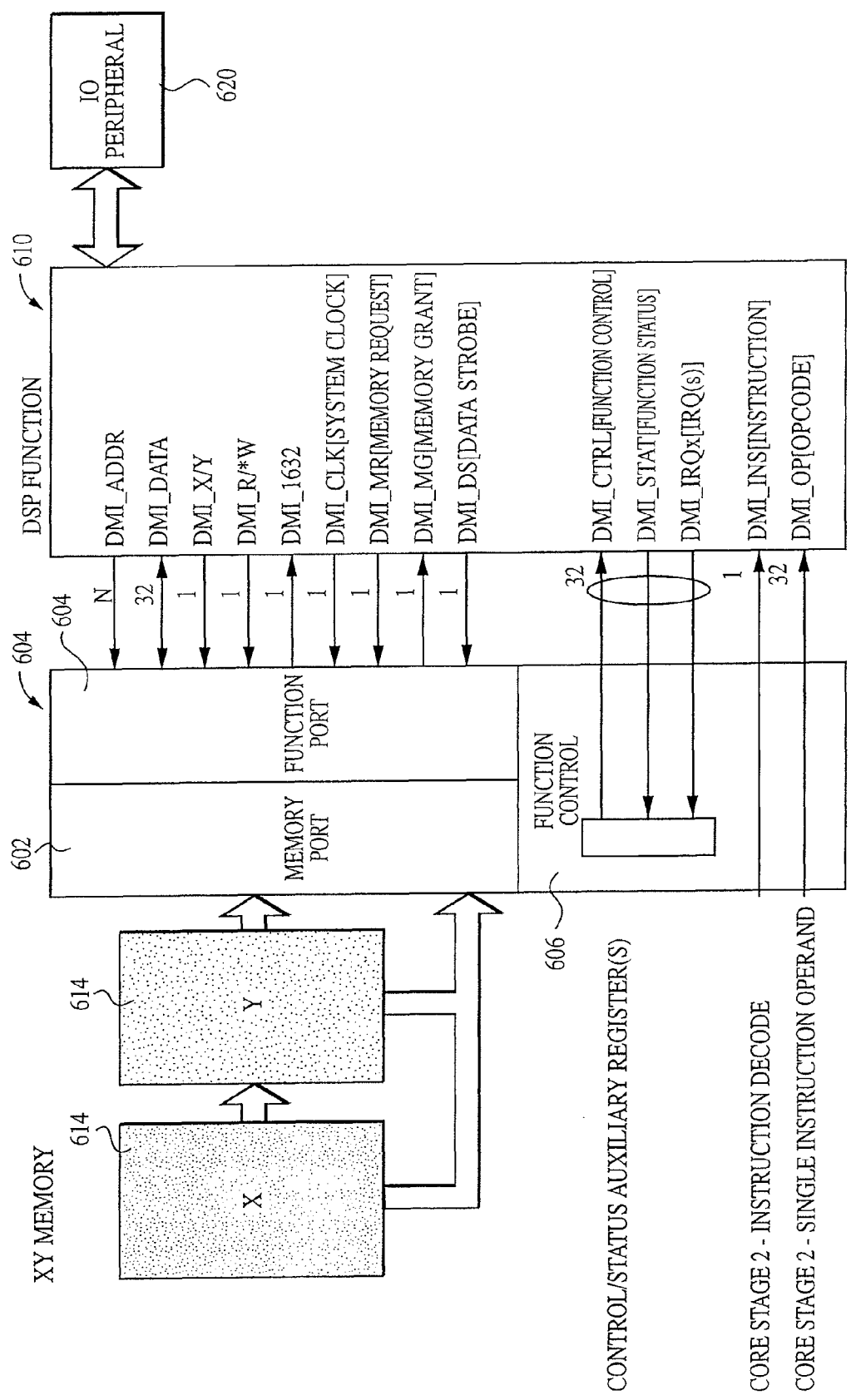
FIG. 6 is block diagram of one embodiment of the interface of the invention, illustrating the various signals and registers associated therewith.

The number of function ports 204 (and hence macro functions 210) is determined by the algorithmic needs of a particular application, and the necessity for hardware acceleration in that application. The number of memory ports 202 (and hence memory banks 214) is determined by the virtual flow of data between macro function blocks, the latter equivalent to a macro function block processing pipeline under CPU control. If a macro block 210 is processing data from a peripheral device (such as shown in FIG. 6 herein) before storing to CPU local memory, then the number of memory banks 214 is determined by the buffering requirements associated with the macro block function, and the ability of the CPU to process data in software.

The memory ports 202 of the apparatus of FIG. 2 comprise interfaces with the banks 214 of the array 212. Advantageously, there are no control registers associated with the memory ports 202; rather, control is performed via the associated IC function 210. The interface 200 arbitrates access to each of the memory banks 214 using the arbitration controller 208. The memory ports of the illustrated embodiment comprise simple address, data, read, write, select, and control signals required by typical random access memory (RAM) design instantiations as are well known in the semiconductor arts, thereby making optimal use of existing technology.

One embodiment of the arbitration controller logic is described. The arbitration controller 208 comprises a multiplexer adapted to select between burst, direct memory interface (DMI) devices, debug (not shown) functions, and the processor. The construction and operation of multiplexer devices are generally well known in the semiconductor arts, and accordingly not described further herein. The multiplexer of the present invention, however, is controlled by logic which provides the following priority structure: (i) the burst address is selected with the highest priority; (ii) external device permission to access the memory of the bank is given next priority; (iii) the debug channel is selected when the parent processor core (e.g., ARC) is halted, and the host device attempts to access the XY memory; and (iv) the processor source and destination operand busses are otherwise selected if appropriate. It will be recognized that other priority structures may be implemented consistent with the invention, however.

Figure 7:
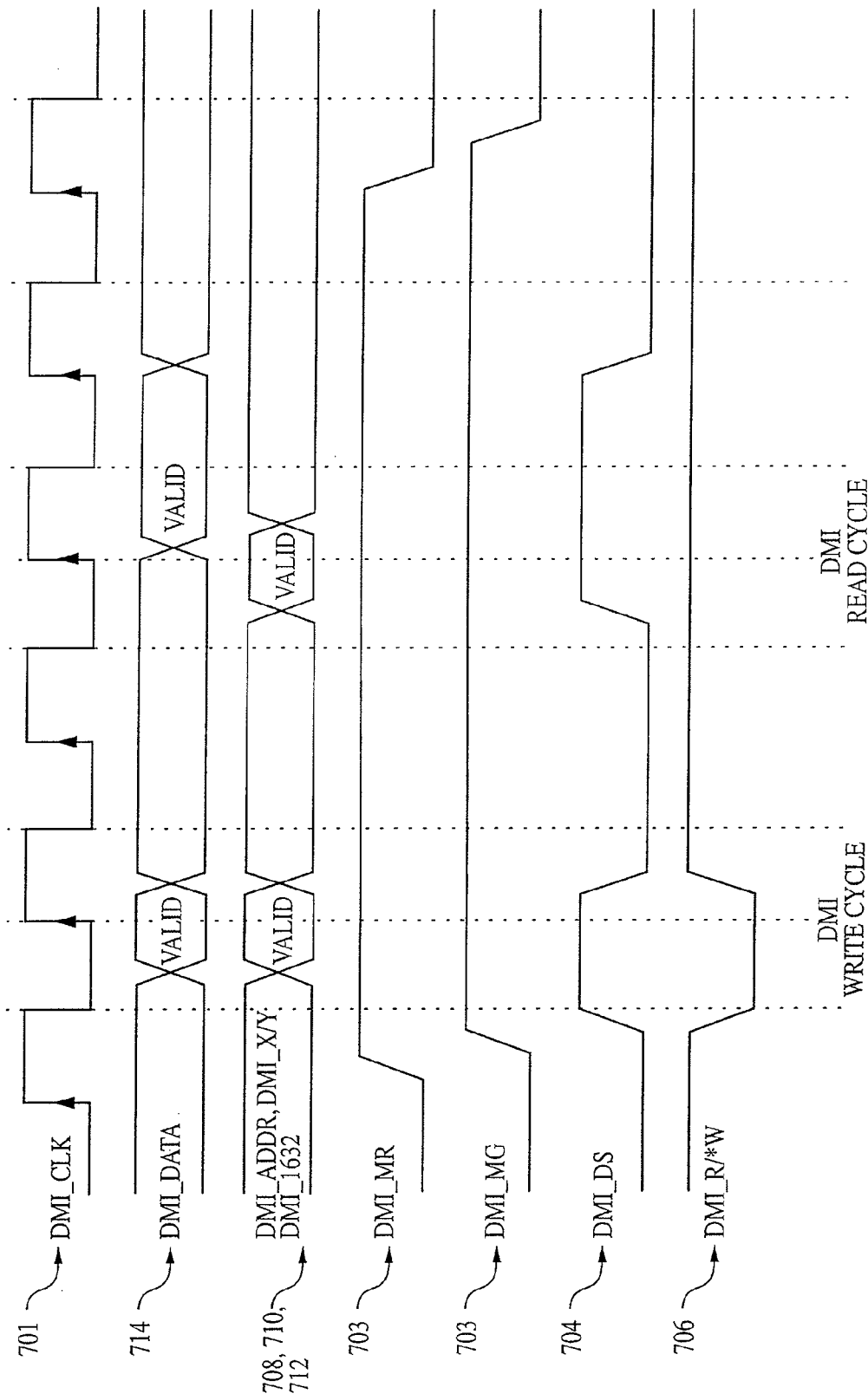
FIG. 7 is a timing diagram illustrating one embodiment of the protocol used in conjunction with the interface of the present invention.

The function ports 204 comprise the interface of the memory interface 200 with the IC functions 210. All data, control, and clock signals are routed through the function ports 204. A synchronous protocol, described in detail herein with respect to FIG. 7, is used in the present embodiment to facilitate read/write data transfer through the ports 204, although it can be appreciated that other protocols (synchronous or non-synchronous) may be substituted. It will be recognized that the illustrated arrangement shows a minimum interface requirement, and other more complex or functionally enhanced arrangements (or combinations thereof) can be substituted. For example a virtual component interface (VCI) of the type well known in the art could be used consistent with the invention.

Figure 2A:
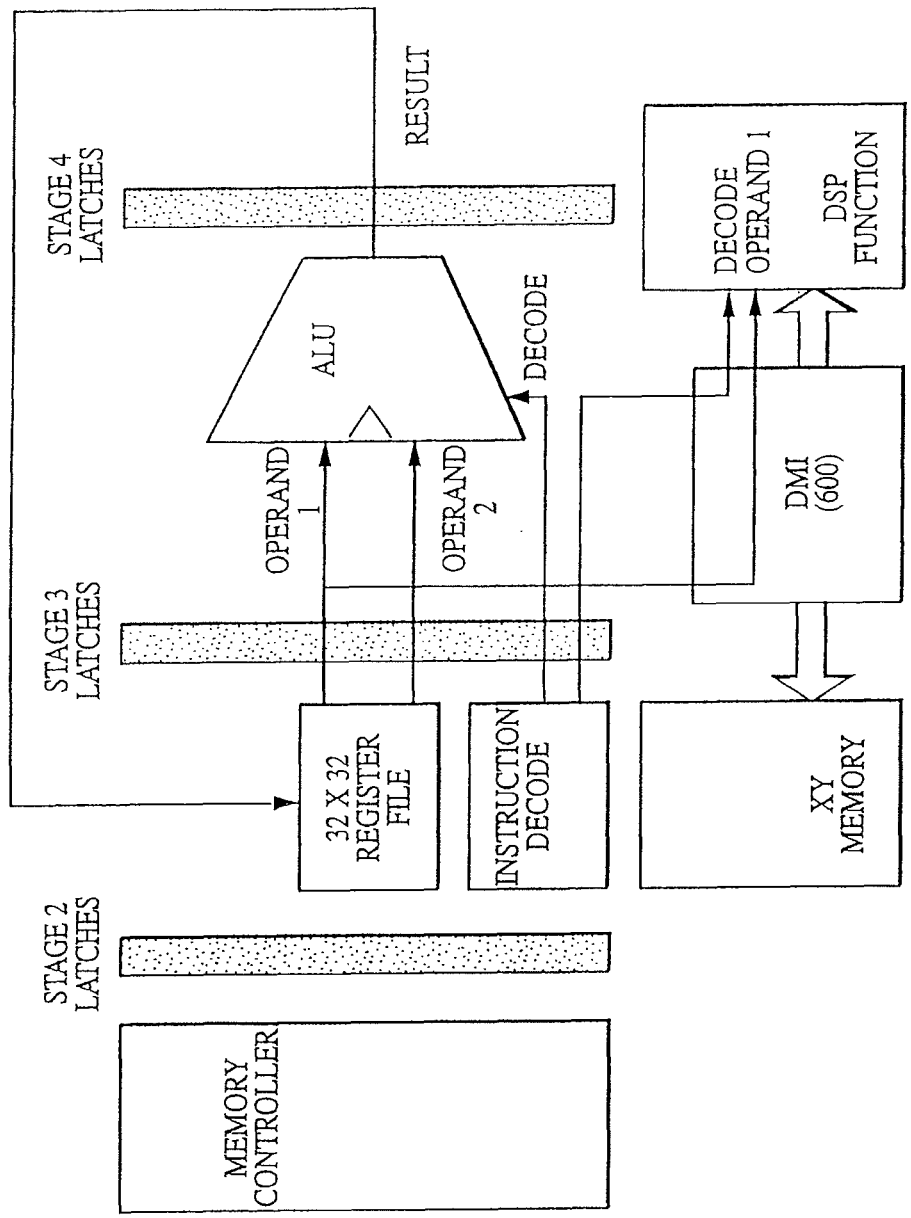
FIG. 2a is a logical block diagram of one exemplary embodiment of logic adapted to provide decoded instruction and operand information from the parent processor's decode pipeline stage to the memory interface of the invention.

The function controllers 206 comprises the control, status, and test registers (see Tables 4-6 below) associated with each of the IC functions 210. The function controllers also include an interface (as illustrated in the exemplary configuration of FIG. 2a) to the core processor's stage two instruction decode and source operand value.

The interface 200 of the invention further utilizes a data transfer "fabric" which interconnects the memory ports 202 with the function ports 204, thereby facilitating data distribution within the interface. In the embodiment illustrated in FIG. 2, the fabric comprises a crossbar arrangement (represented by the series of arrows 216 of FIG. 2) for data communication between the ports 202, 204, although it will be appreciated that other techniques for (selectively) communicating data form one or more ports to one or more ports may be utilized. The construction and operation of crossbar switches is well known in the electronic arts, and accordingly is not described further herein.

Using the aforementioned crossbar arrangement, each IC function 210 is connected through the interface 200 to a bank 214 of the memory array 212, and multiple functions/banks may be connected simultaneously. In the illustrated embodiment, the memory array 212 comprises XY memory. Such memory may comprise, for example, static random access memory (SRAM), dynamic random access memory (DRAM), synchronous DRAM (SDRAM), double-data rate (DDR) SDRAM, embedded/flash memory, or any other type of memory suitable for the desired application. Such memory devices are well known in the semiconductor arts, and accordingly will not be described further herein. The determination of which memory bank 214 in the array 212 is accessed is made either by (i) a control register in processor core auxiliary register space; or (ii) the instruction operand (e.g. "FFT 2" of the aforementioned ARC core). For example, in the case where the IC function comprises a DSP, the individual functions associated with the DSP can access any of the XY memory banks 214 in the array 212 for intermediate calculations and results. In one embodiment of the invention, the XY memory is implemented as two pages of memory, and adapted such that two operand sources may be provided simultaneously. Alternatively, provision may be made for selection between one of the two pages of memory at any one time if desired.

It is noted that different DSP cores (or other types of processor cores) will generally have varying interface, control and memory requirements. The interface 200 of the present invention advantageously provides the designer with the ability to integrate cores of various configurations directly with the parent processor core (e.g., extensible ARC processor) instruction and operand decode mechanism, auxiliary register, and on-core memory resources. The chip/system designer may choose to either to add an HDL "wrapper" around the DSP or core to translate signals, buffer memory interfaces, and synchronize clock signals, or alternatively modify the "soft" DSP core implementation to meet the specification associated with the memory interface 200, as described below with respect to FIGS. 11a and 11b.

Figure 3:
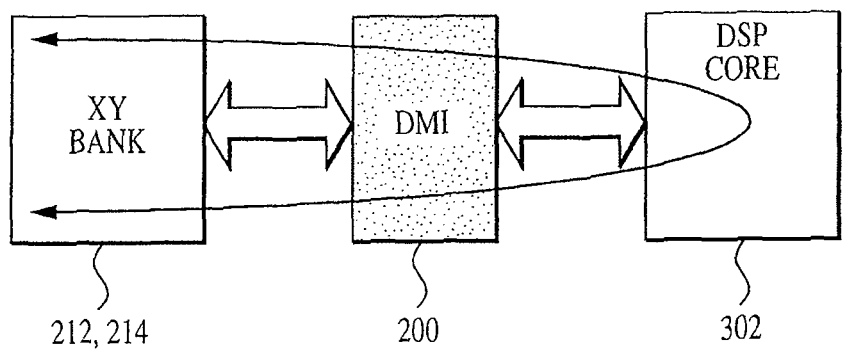
FIG. 3 is a block diagram illustrating a first application of the interface of FIG. 2, wherein the DSP core is "tightly" coupled to the parent processor core (e.g. ARC) and XY memory.
Figure 5:
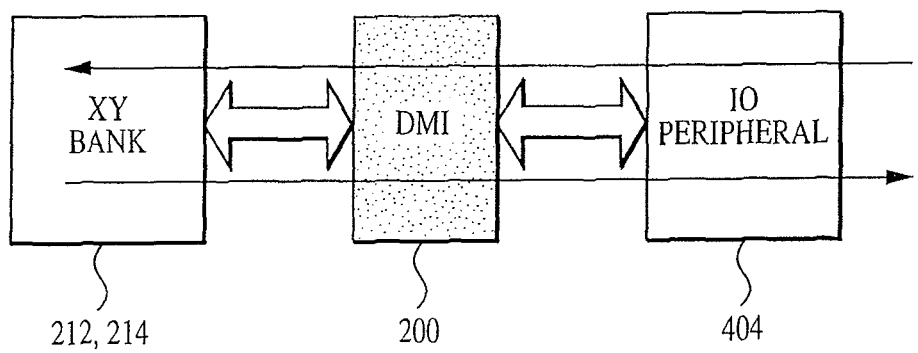
FIG. 5 is a block diagram illustrating a third application of the interface of FIG. 2, wherein the interface is used to interface directly between an I/O device and the XY memory.
Figure 4:
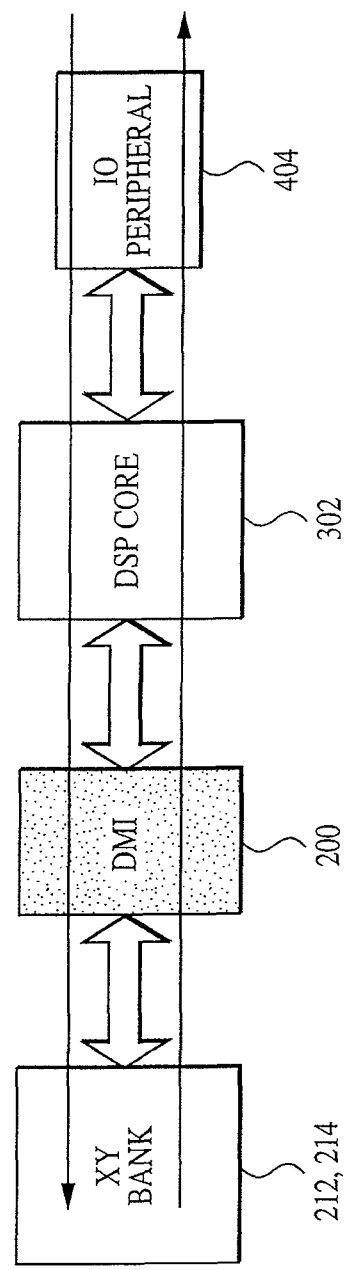
FIG. 4 is a block diagram illustrating a second application of the interface of FIG. 2, wherein the DSP core is served by a separate I/O interface, the DSP core being controlled by the processor core.

Referring now to FIGS. 3-5, exemplary applications of the memory interface 200 of the present invention are described, illustrating how the interface 200 can be used to integrate devices such as DSP cores, ASICS, or other types of peripherals. As illustrated in FIG. 3, a DSP core 302 may be tightly coupled to an associated processor core (e.g., ARC) using the interface 200. As used herein, the term "tightly coupled" refers generally to the degree of interaction and coherence between the DSP core, interface, and parent processor. In the example of FIG. 3, the DSP core 302 can act on buffered data contained in the XY memory bank 212. The interface 200 of the present invention allows the DSP core 302 to be initiated by an instruction from the parent processor core (not shown), and uses the parent processor core extension registers for control. Specifically, auxiliary registers may be mapped to control the macro function block 210 and report status, and may be accessed through "LR" and "SR" instructions, as illustrated in the following example:

```
ld    %r0, #CONTROL_WORD
sr    %r0, [macro_control]    ; load the control word into auxiliary
                                reg.
ld    %r0, #BANK
go_macro  0, %r0              ; source operand contains bank to act
                                on
:
:
Irq_macro_ready:
   lr   %r0, [macro_status]    ; read status
```

Copyright ©2001 ARC International plc. All rights reserved.

As illustrated in FIG. 4, some DSP core functions (such as calculations performed in support of the aforementioned high-speed 3G communications) may require data at a higher rate than can be provided by the parent processor core. In the example of FIG. 4, the DSP core 302 is served with data by a local peripheral device 404 (such as a data storage device), and delivers "processed" results (such as, for example, the output of a FFT algorithm, packing/unpacking data from a high data rate bit stream, or Viterbi decode metrics) directly into the XY memory 214 of the processor. The interface 200 further provides support for interrupts and flags to indicate, inter alia, block filled or empty status. As shown in FIG. 6, DSP function status signals may be connected to bits in registers mapped into the parent processor's auxiliary register space. Similarly, bits in that register may be used to enable the routing of interrupt signals from the DSP function to processor's interrupt controller.

As illustrated in the example of FIG. 5, the I/O peripheral device 404 may also interface directly with the memory interface 200. In this manner, unprocessed or "raw" data may be delivered directly to the various memory banks 214 within the memory array 212 as arbitrated by the interface 200. Hence, the memory interface advantageously allows the memory array to act as a multi-bank buffer for storage and subsequent read-out of such raw data.

In terms of operation, the functions of the DSP core 302 (or other IC function in communication with the interface 200) may, if desired, be initiated by the processor core (e.g. ARC™) pipeline stage 2 instruction decode, and also may optionally use the operand value. Other schemes of DSP core or peripheral initiation may also be used consistent with the invention. For example, it is also possible to initiate and control the DSP core or IC function using one or more control/status registers within the auxiliary space associated with the parent processor.

It is also noted that one or more XY memory banks 214 within the array 212 can advantageously be filled by a "burst" mode load while DSP functions execute on other memory banks. The memory interface 200 and the X/Y memory burst control unit (not shown) arbitrate between accesses. The burst control unit provides direct memory access (DMA) between the main memory and the XY memory system. Its functionality includes the ability to transfer blocks of data, and in one embodiment is integrated with the existing XY system. Note also that the arbitration unit of the present invention includes logic to arbitrate between the processor, an external DSP core (via DMI), host debug port (also not shown) and the parent processor, as previously described.

In one embodiment, the occupied memory resource is "locked out" by one access to another using a first-in-time method (i.e., whichever access is initiated first will lock the other access out until completed), as illustrated below:

```
ld    %r0, #CONTROL_WORD
sr    %r0, [macro_control]    ; load the control word into auxiliary
                                reg.
go_macro  0, %r0              ; source operand contains bank to act
                                on
:
:
mov   %r0, x0_u
```
Copyright ©2001 ARC International plc. All rights reserved.

In the foregoing example, the move (mov) instruction is attempting to transfer data from XY memory into a core register. Two arbitration solutions are possible: (i) either stall the move operation until the macro function completes, or (ii) with additional control logic, stall the macro function and allow processor access to a non-conflicting memory region.

It will be recognized, however, that other types of memory arbitration of the type well known in the art may be utilized to provide non-conflicting memory resource access, round-robin or prioritized arbitration with time division, queued or packetized transfer.

If either the aforementioned burst mode or DSP core function have control over X/Y memory, then "read or "write" operations by the parent processor core to that memory bank will be invalid, but this will not stall the processor core, as block transfers are, in the present embodiment, permitted to take multiple cycles. Hence, in this embodiment, the programmer has the responsibility of ensuring that such automated memory accesses, once initiated, have completed, although other mechanisms for ensuring memory access operation completion may conceivably be used. The following shows a polled solution to invalid parent processor XY access during burst mode:

```
    sr      [burst_control],        ; DMA data into
            #INITIATE_BURST
XY memory.
:                                   ; No access to same XY
bank here
:                                   ;
Wait:
    lr      %r0, [burst_status]
    bne     Wait                    ; Wait for DMA to
```

```
complete
    mov     %r0, x0_u               ; XY access allowed
```
Copyright ©2001 ARC International plc. All rights reserved.

Data Transfer Protocol

When the DSP core 302 or I/O device 404 (FIGS. 3-5) requests access to a memory bank 214 within the array 212, access is arbitrated by the interface 200, specifically the arbitration controller 208 (FIG. 2). The interface 200 of the invention provides data, address, XY page and read/write selection using a memory request/memory grant system which is synchronous with the system clock (CLK). FIG. 6 illustrates a simple interface configuration 600, based on a standard bus-request/bus-grant mechanism, having only one memory port 602 and one function port 604. The interface 600 is coupled via the function port 604 to a DSP function 610, which is coupled to an I/O peripheral 620. The X/Y memory banks 614 interface directly with the memory port 602 of the interface 600. The function controller 606 includes the data, control, and debug register set for the function port 604, and also interfaces with the stage 2 instruction decode (1-bit) and operand (32-bit) of the parent processor core.

The signal set associated with the exemplary interface 600 of FIG. 6 is now described with respect to Tables 1-3 below. Table 1 lists interface signals for the interface 600 and their associated functions. Table 2 lists memory request/grant signals. Table 3 lists register control signals and signals generated by the processor core (e.g. ARC™) used to initiate function execution and to provide immediate operands from pipeline stage 2, as previously described.

Figure 6A:
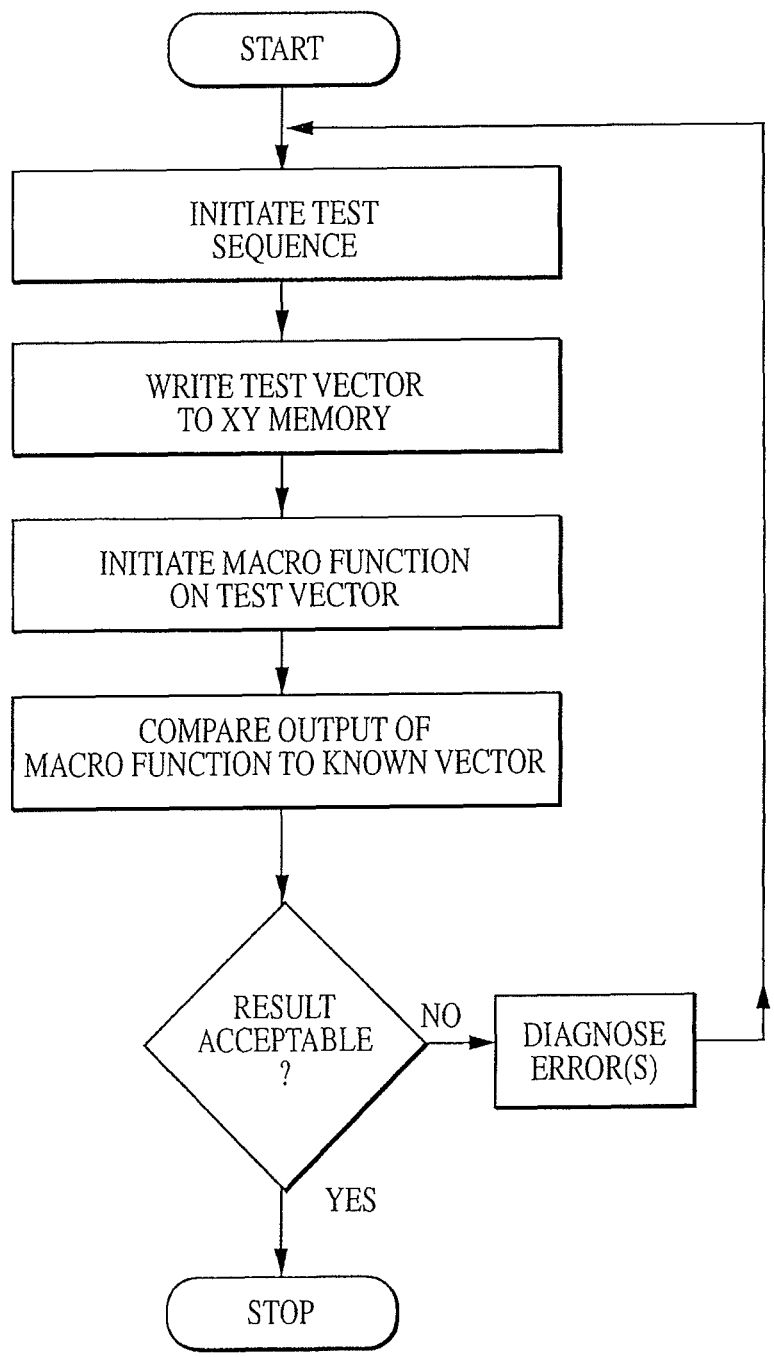
FIG. 6a is a logical flow diagram illustrating one exemplary embodiment of the method for testing a macro function using the memory interface of the present invention.

In the present invention, the control signals used to initiate the macro function are duplicated in one or more control registers. Specifically, in one embodiment, the signals are connected such that a "write" operation to the control register in auxiliary space is registered as a valid command as if correct in stage 2 of the processor pipeline. This ability, inter alia, facilitates the testing of the macro block through the host interface, as described below in greater detail. As auxiliary registers will be accessible from the host interface, this design feature advantageously ensures that the function can be tested. For example, a test sequence might write an input test vector into XY memory, initiate the macro function, and then compare returned results against a known vector. This process is depicted graphically in FIG. 6A. Such process may be applied to any number of different operations including, for example, decoding of convolution-encoded data by a Viterbi function (and "Turbo" decode), or correct calculation of a CRC for a block of data.

Additional auxiliary registers may be used for test purposes as well. For example, in Applicant's ARC core, four test registers are configured for each function port by default. Specifically, if a macro block is connected to a peripheral device, the four test registers can be used to simulate the action of that peripheral under software control. Comparison of transform results in memory to the known stimulus can therefore be achieved for validation of the correct functioning of the macro block 210, advantageously without having to generate real-world stimuli. Other uses of the test registers are possible depending on the testing/operational requirements. It will also be recognized, however, that such additional auxiliary registers are optional, and may be specified in any number desired by the programmer/designer as allowed by the hardware constraints.

In the present embodiment, a number of read/write registers associated with each function port are provided. A default value is normally set, but as with the auxiliary registers, this number may vary. These read/write registers are used for control and data requirements specific to the function associated with the function port, such as, for example, error reporting such as internal data saturation of a fast fixed-point FFT block, status of a connected peripheral, etc.

One or more control registers are also provided. A basic requirement of the control register in the present invention is that power control and external function reset capabilities are provided. This reset (or other control) forces the function to release the memory bank back to the parent processor core. Interrupt control is provided and enabled by the control register, but the IC function also reports internal function status to the processor core using flags.

Tables 4-6 list registers used within the exemplary interface 600 of FIG. 6. Table 4 lists control/status registers; in the illustrated embodiment, two control/status registers are provided which control read/write operations. Table 5 lists general purpose registers; four general purpose registers are provided within the interface 600 for passing control parameters and data to the IC function, and for implementing special features. For example, the control parameters passed to the IC function could comprise FFT size or window type, and the IC function could return a block exponent or cyclic redundancy code (CRC) via the general purpose registers. Another example is for a DES instruction having the key code and accumulators as extension registers. Many other uses are possible.

Table 6 lists test/debug registers within the interface 600; four registers are provided in the present embodiment for, inter alia, function specific testing and debug capability. For example, as previously described, if a macro block is connected to a peripheral device the test registers might be used to simulate the action of that peripheral under software control, with comparison of transform results in memory to the known stimulus without having to generate real-world stimuli.

TABLE 1

| Interface Signals | |
|---|---|
| Signal | Description |
| DMI_DATA | Data read/write bus from custom function. 16/32-bit data. |
| DMI_ADDR | Address bus from custom function. Bus size depends on bank size. |
| DMI_X/Y | Signal from custom function selects X or Y bank for read or write. |
| DMI_1632 | Signal from custom function selects 16 or 32-bit addressing and data bus mode. |
| DMI_R*/W | Signal from custom function requests read or write. |

TABLE 1-continued

| Interface Signals | |
|---|---|
| Signal | Description |
| DMI_BNK | Signal from custom function requests XY bank for transfer. |

TABLE 2

| Memory Request/Grant Signals | |
|---|---|
| Signal | Description |
| DMI_CLK | System clock output from ARC Memory Interface. |
| DMI_MR | Memory request signal from custom function. |
| DMI_MG | Memory grant signal from ARC Memory Interface. |
| DMI_DS | Data strobe signal from custom function. |

TABLE 3

| Register Control Signals | |
|---|---|
| Signal | Description |
| DMI_CTRL | Control signals output from ARC Memory Interface control/status register. |
| DMI_STAT | Status signals from custom function. |
| DMI_IRQ | Interrupt signals from custom function (enabled in control/status register. |
| DMI_INS | ARC state 2 instruction decode (via ARC Memory Interface) used to initiate function execution. |
| DMI_OP | ARC state 2 operand (via ARC Memory Interface) used for basic function parameters. |

TABLE 4

| Register Control Signals | |
|---|---|
| Signal | Description |
| DMI_CTRLx | Write: IRQ enable, reset, power, run/stop, clear error, test mode, free bits . . . |
| DMI_Opx | Write: Set operand for function initiation via DMI_CTRLx. Read: An error code may be returned by a read. |

Notes:

1. Default bit positions are defined in the implementation specification. For example, the settings of Table 4a are representative bit positions:

TABLE 4a

| Representative Bit Positions | | | | | | | | |
|---|---|---|---|---|---|---|---|---|
| 8 | 7 | 6 | 5 | 4 | 3 | 2 | 1 | 0 |
| RESET | IRQ_ENABLE | POWER | RUN | CLEAR_ERROR | TEST_MODE3 | TEST_MODE2 | TEST_MODE1 | TEST_MODE0 |

2. An "x', in the register name specifies the function to which the register applies. All registers of the illustrated embodiment are 32-bits.

TABLE 5

General Purpose Registers

| Signal | Description |
|---|---|
| DMI_GP0x | Function specific read/write register. |
| DMI_GP1x | Function specific read/write register. |
| DMI_GP2x | Function specific read/write register. |
| DMI_GP3x | Function specific read/write register. |

TABLE 6

Test/debug Registers

| Signal | Description |
|---|---|
| DMI_DBG0x | Function specific read/write test/debug register. |
| DMI_DBG0x | Function specific read/write test/debug register. |
| DMI_DBG0x | Function specific read/write test/debug register. |
| DMI_DBG0x | Function specific read/write test/debug register. |

It is noted that while the foregoing embodiment described a specific number of signals and registers associated with these signals, variations in the configuration of the interface, including the number and function of signals, and/or the number of registers, may be employed depending on the specific application and needs of the designer/programmer.

Referring now to FIG. 7, one embodiment of the interface protocol according to the invention is described. While the DSP function 610 may have its own clock, data exchange with the interface 600 is, in the present embodiment, synchronized with the clock of the processor core. Data is strobed in and out of the memory 612 after memory access has been requested and granted as previously described.

As illustrated in FIG. 7, the clock signal (DMI_CLK) 701 comprises a regular periodic clock signal of the type well known in the art. During a write cycle 702, the memory request and grant signals (DMI_MR, DMI_MG) 703, data strobe signal (DMI_DS) 704, data read/write signal from the IC function (DMI_R/*W) 706, and addressing/bus size select/X or Y memory bank select signals (DMI_ADDR, DMI_X/Y, and DMI_1632, respectively) 708, 710, 712 are set as indicated in FIG. 7 to perform a write operation from the data bus (DMI_Data) 714 to the selected address within the X or Y bank via the interface 600. Conversely, during the read cycle, the interface 600 sets the aforementioned signals 703, 704, 706, 08, 710, 712 as appropriate to load data from the selected memory bank 614 and transfer it to the IC function using the interface 600; i.e., via the memory port, fabric, and function port to the IC function.

Figure 8:
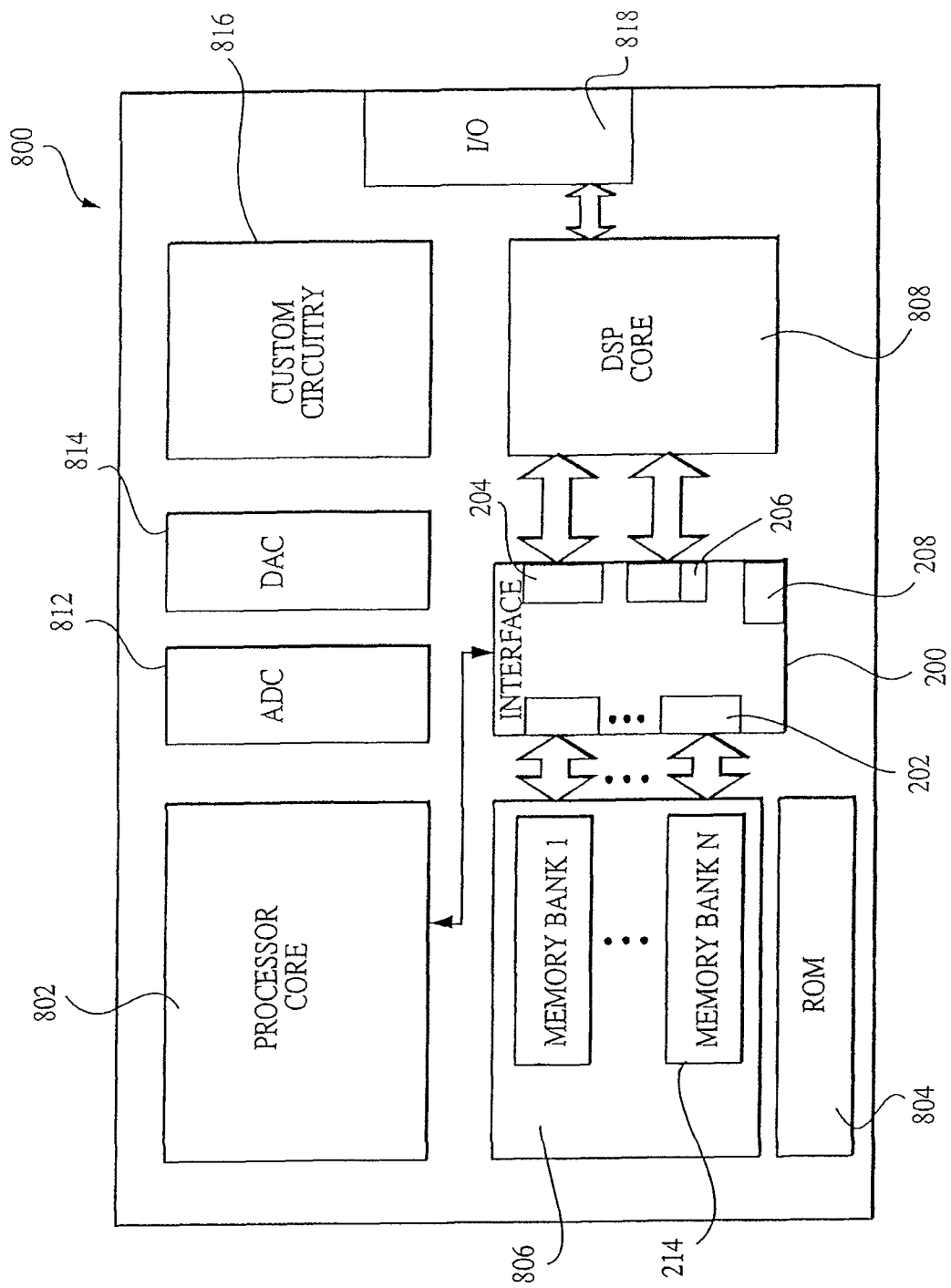
FIG. 8 is a block diagram of one exemplary embodiment of an integrated processor device including a processor core, DSP core, XY memory, and the memory interface of the present invention.

FIG. 8 illustrates an exemplary pipelined processor (system) fabricated using a 1.0 micron process. As shown in FIG. 8, the processor 800 includes, inter alia, a processor core 802, on-chip read-only memory 804, XY random access memory 806, a DSP core 808, memory interface 200, ADC 812, DAC 814, custom analog and/or digital circuitry 816, and an external interface 818. The device is fabricated using the customized VHDL design methodology of Applicant's co-pending U.S. patent application Ser. No. 09/418,663 entitled "Method and Apparatus for Managing the Configuration and Functionality of a Semiconductor Design" filed Oct. 14, 1999, which is incorporated herein by reference in its entirety. The interface 200 of the present invention may advantageously be integrated directly into the configuration environment described therein, as discussed in greater detail below with respect to FIGS. 11-12. Many of the interface 200 configuration parameters, such as the number of memory ports, may be inherited directly from the XY memory configuration specified in this environment. The generated design is subsequently synthesized into a logic level representation, and then reduced to a physical device using compilation, layout and fabrication techniques well known in the semiconductor arts.

It will be appreciated by one skilled in the art that the processor of FIG. 8 may contain any commonly available peripheral such as serial communications devices, parallel ports, timers, counters, high current drivers, LCD drivers, memories and other similar devices. The present invention is not limited to the type, number or complexity of peripherals and other circuitry that may be combined using the method and apparatus. Rather, any limitations are imposed by the physical capacity of the extant semiconductor processes which improve over time. Therefore it is anticipated that the complexity and degree of integration possible employing the present invention will further increase as semiconductor processes improve. For example, the present invention is compatible with 0.35, 0.18, and 0.1 micron processes, and ultimately may be applied to processes of even smaller or other resolution. An exemplary process for fabrication of the device is the 0.1 micron "Blue Logic" Cu-11 process offered by International Business Machines Corporation, although others may be used.

Figure 9:
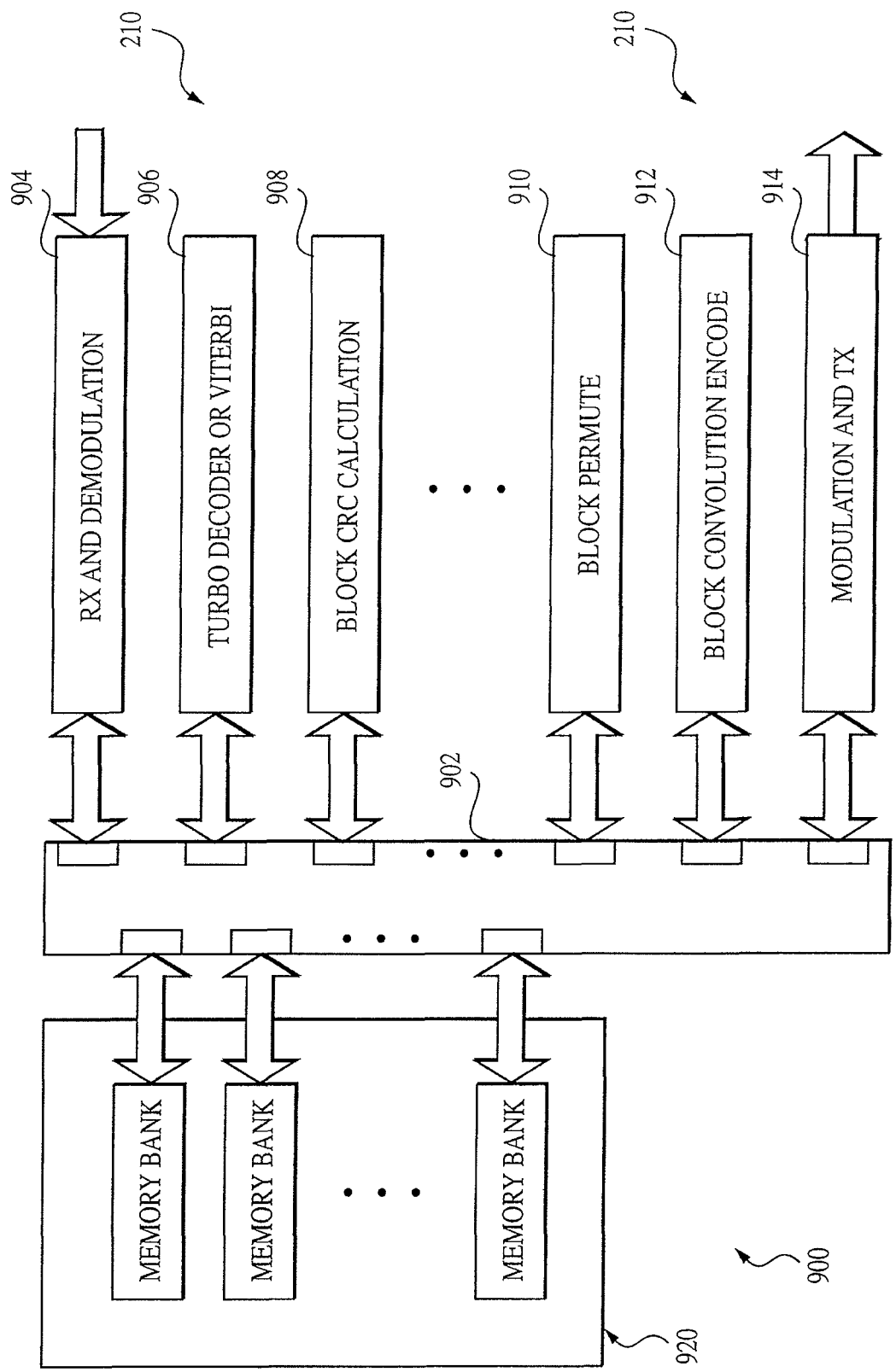
FIG. 9 is a block diagram of a second embodiment of an integrated processor device including the memory interface of the present invention and a plurality of macro function entities, the processor device and macro function entities being adapted for 3 G communications.

FIG. 9 illustrates yet another embodiment of an integrated circuit 900 fabricated using the apparatus and methods of the present invention. Specifically, the IC comprises an application specific integrated circuit (ASIC) embodying a "3G" (i.e., third generation) communications application having a plurality of macro functional blocks 210. The macro functional blocks 210 of the memory interface 902 include a signal receiver and demodulation block 904, "turbo" or Viterbi decoder block 906, block CRC calculation macro block 908, block permute macro block 910, block convolution encoder macro block 912, and modulation and transmit block 914. The memory banks 920 act to form circular buffers of the type well known in the data processing arts. Data remains in the memory banks 920 and is acted on by the macro blocks 210 in sequence.

Furthermore, multiple macro blocks may be active as a "macro pipeline" controlled by the CPU as illustrated in FIG. 9a. Specifically, the macro functions, under CPU control via customized instructions within the base or extension instruction sets of the parent processor, sequentially act on data transferred to or out of the memory array in lockstep or pipelined fashion via the memory interface of the invention. FIG. 9a illustrates the pipelined flow of block data in a 4-memory bank, 4-function configuration of the present invention. Exemplary pseudo-code for this operation is as follows:

```
for(;;)
{
    function0(bank[cycle+0]%BANKS]);      /* Initiate functions */
    function1(bank[cycle+1]%BANKS]);
    function2(bank[cycle+2]%BANKS]);
    function3(bank[cycle+3]%BANKS]);
    while(all_functions_not_complete);    /* Wait */
    cycle++;
}
```

Copyright ©2001 ARC International plc. All rights reserved.

Referring now to FIG. 10, the method of interfacing a function with a memory array according to the invention is described. In the first step 1002 of the method 1000, a number of function ports and memory ports are specified or defined for the interface. As previously described, the interface may, in one example, inherit the number of memory ports from the parent processor core design (as specified by the user/design constraints).

Next, in step 1004, the number of control and other registers needed for the interface is set based on the function port configuration. In one exemplary embodiment, a library of macro blocks with compatible interfaces is instantiated in the design by the (e.g. the semiconductor synthesis and design software manufactured by the Assignee hereof, and described in detail in Assignee's co-pending U.S. patent application Ser. No. 09/418,663, previously incorporated herein). Under such approach, the aforementioned software has knowledge of the block's requirements, and can instantiate the interface block appropriately.

The interface protocol is then specified in step 1006. One exemplary synchronous protocol is described herein with reference to FIG. 7. In step 1008, the function(s) associated with the function port(s) is/are initiated. As previously described, the functions may be initiated by the processor core stage 2 pipeline decode, using one or more control/status registers in auxiliary memory space, or even other methods. In step 1010, memory accesses are arbitrated by the crossbar/arbitration unit, 216/208 (FIG. 2) based on the memory access request/grant scheme previously described, or other arbitration scheme. Lastly, in step 1012, the read/write access to memory are conducted according to the selected protocol and control by the parent via one or more extension registers.

Figure 11:
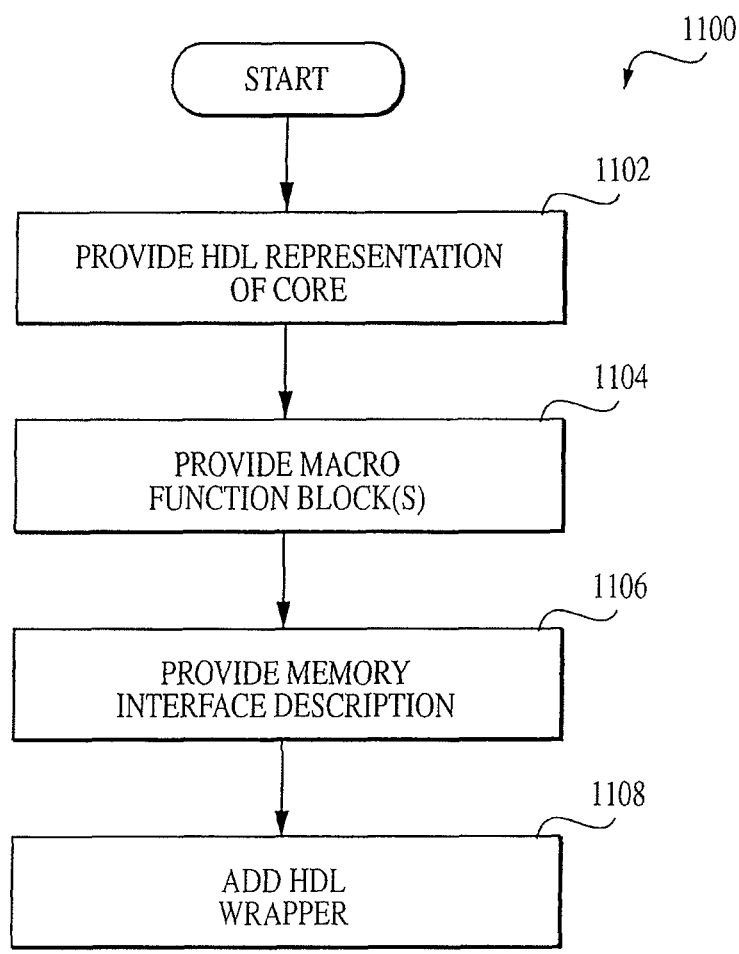
FIG. 11 is a logical flow diagram illustrating one exemplary embodiment of the method of generating a design for an integrated circuit device having a parent processor, a memory interface, and at least one macro function associated therewith, wherein an HDL "wrapper" is used as the macro function interface.

Referring now to FIG. 11, an improved method of designing an integrated circuit device having an extensible processor core, secondary processor (e.g., DSP) or macro function, and memory interface is described. As shown in FIG. 11, one embodiment of the method 1100 generally comprises first providing an HDL representation of an extensible core cell, such as the ARC user-configurable core previously described herein (step 1102). Next, HDL representations of one or more macro functions (blocks) are provided per step 1104. Examples of macro functions include the Viterbi decode, convolutional encoding, or CRC block previously described. Next, in step 1106, HDL representations of one or more memory interfaces as described herein with respect to FIG. 3 are provided. An HDL "wrapper" (i.e., a complementary HDL description designed to adapt to, and interface with, the selected macro functions) is then generated and disposed "around" the aforementioned macro function(s) in step 1108. As used herein, the terms "wrapper" and "around" are not necessarily used in a physical or spatial context, but rather in a figurative sense in that the HDL wrapper functionally envelopes the macro function block(s) (e.g., DSP core) so as to provide proper communication between the existing function block and the memory interface of the invention. Specifically, such communication includes (i) translating signals transmitted to and from the memory interface, (ii) buffering memory operations, and (iii) synchronizing clock signals of the macro function with the memory interface. Note that in the embodiment of FIG. 11, the pre-defined functions and protocols associated with the macro function block(s) (e.g., DSP) are preserved; the HDL wrapper acts in effect as a translation and interface medium between the macro function and memory interface device, the latter ultimately coupled to the memory array.

Figure 11A:
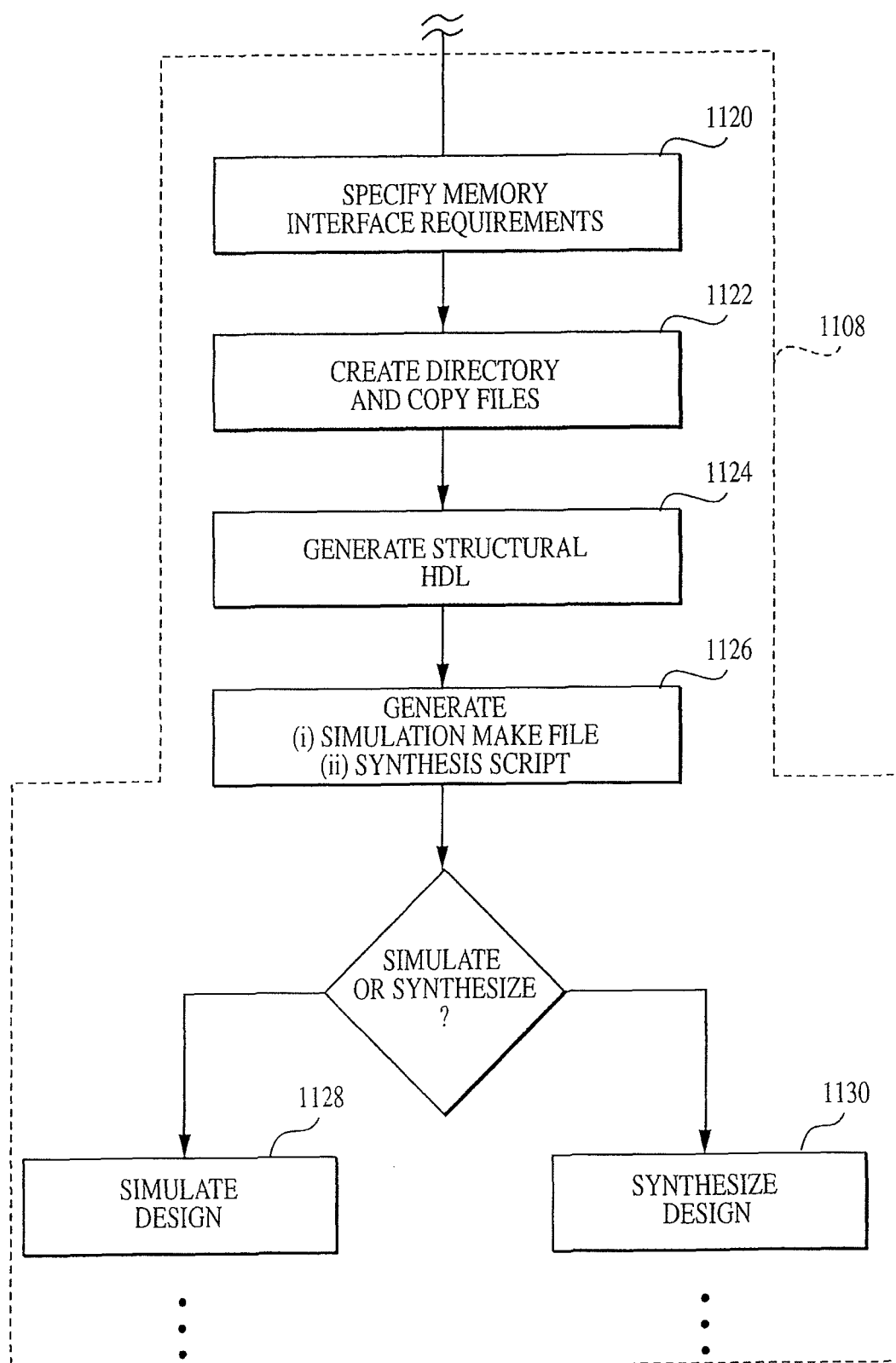
FIG. 11a is a logical flow diagram illustrating one embodiment of the method of adding an HDL wrapper according to FIG. 11.

FIG. 11a illustrates one embodiment of the method of designing an integrated circuit adding the HDL wrapper according to step 1108 of the method 1100 of FIG. 11. In general, the system builds from the master database a hierarchical directory structure containing HDL files that fully describe the parent processor. The memory interface is included in the master database and, once the memory interface and other related parameters are selected by the user, are included in the directory structure.

The memory configuration (i.e., use of memory interface and number of memory ports and function ports) is first specified by the user (step 1120). The system builder script is then invoked (step 1122) to (i) create a working directory of the user files, and (ii) copy files, including VHDL for macro functions and memory interface as required from the master database. The selected files are also customized as required to configure the system as selected by the user. The structural VHDL is then generated per step 1124. A simulation makefile and a synthesis script are then generated (step 1126). The designer then simulates or synthesizes the design (including memory interface and macro functions) per steps 1128 and 1130, respectively.

Figure 12:
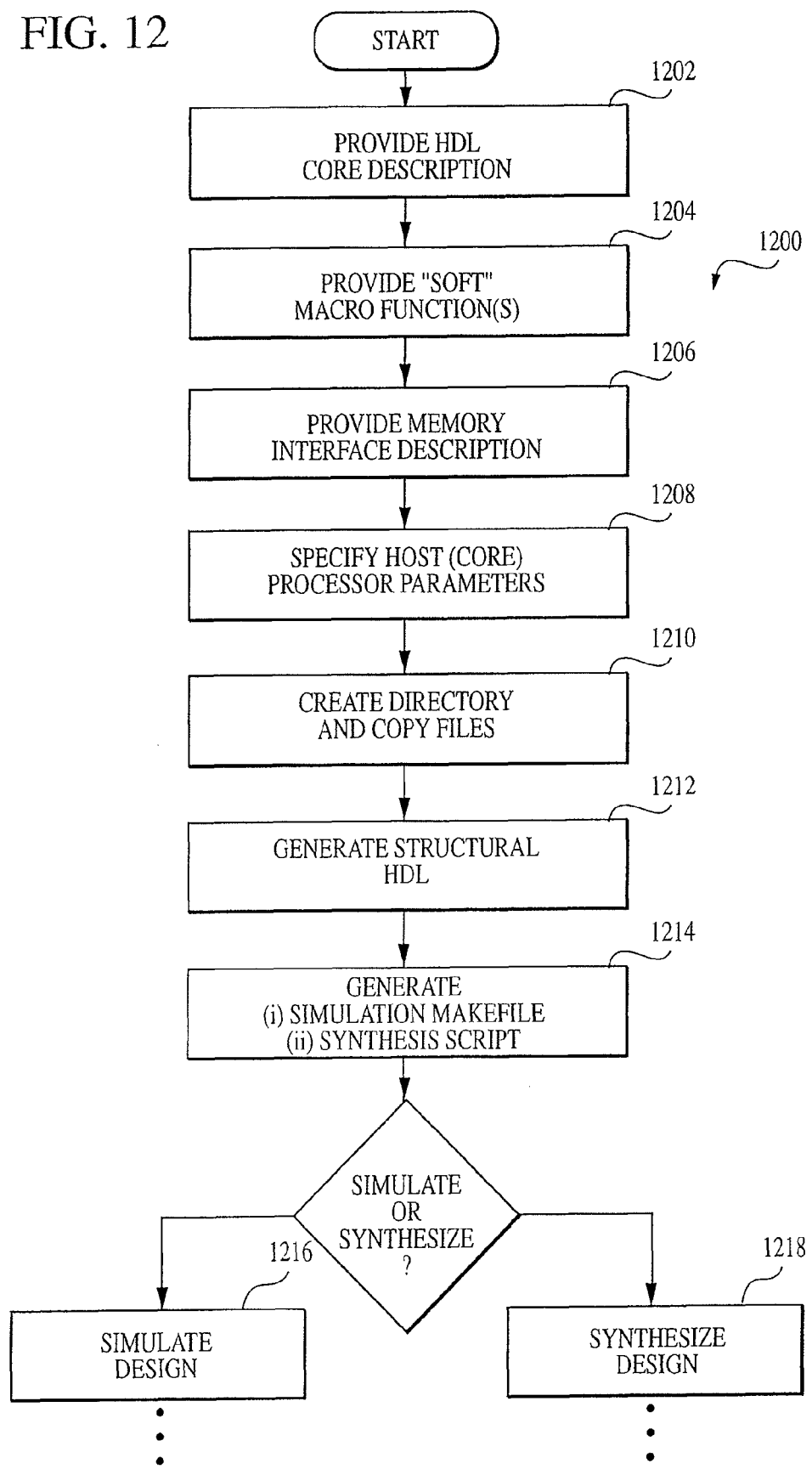
FIG. 12 is a logical flow diagram illustrating a second embodiment of the method of generating a design for an integrated circuit device having a parent processor, a memory interface, and at least one macro function associated therewith, wherein a "soft" macro function is utilized and adapted to the requirements of the memory interface.

FIG. 12 illustrates a second embodiment of the method of designing an integrated circuit according to the invention. The method 1200 generally comprises first providing an extensible core description as previously described (step 1202). Next, at least one "soft" macro function is provided per step 1204. As used herein, the term "soft" refers to a macro function which may be selectively configured by the designer. Such soft macro functions effectively have the HDL wrapper previously described with respect to step 1108 of FIGS. 11 and 11a above incorporated directly into their design. The wrapper furthermore may be made configurable itself.

The memory interface description is next provided per step 1206. In step 1208, the parent processor parameters such as cache size, extension instructions, and type of build (e.g., system versus core only) is selected. The memory configuration (i.e., use of memory interface and number of memory ports and function ports) is also specified. The system builder script is then invoked (step 1210) to (i) create a working directory of the user files, and (ii) copy files, including VHDL for modules and extensions, as required from the master database. One of the copied files in the present example comprises the memory interface file, while another comprises that for the selected "soft" macro functions previously identified for the build by the user. The selected files are also customized to configure the system as selected by the user. The structural VHDL is then generated per step 1212. A simulation makefile and a synthesis script are then generated (step 1214). The designer then simulates or synthesizes the design (including extended core, memory interface, and user-configured macro functions) per steps 1216 and 1218, respectively. Note that in contrast to the method of FIG. 11, the method of FIG. 12 integrates the memory interface with the "soft" macro function(s) (and processor core) during design generation, thereby modifying the macro function configuration.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims appended hereto.

I claim:

1. A processing device, comprising:
a first processor associated with a RISC instruction set, the first processor including an instruction decode stage for decoding instructions that are extensions of the RISC instruction set;
a second processor comprising a plurality of macro functions, the second processor receiving the decoded instructions from the instruction decode stage of the first processor, wherein the macro functions of the second processor are controlled by the decoded instructions;
a memory array having a plurality of memory banks adapted to store data; and
a memory interface, said memory interface having a plurality of first ports adapted for data communication with said memory array, and a plurality of second ports adapted for data communication with said macro functions of said second processor;
wherein the macro functions of the second processor access the data stored in the memory array via the memory interface responsive to receiving the instructions decoded in the instruction decode stage of the first processor, at least two of the macro functions accessing a same memory bank of the plurality of memory banks via a respective first port associated with the same memory bank and respective second ports associated with the at least two macro functions.

2. The device of claim 1, further comprising an arbitration unit which arbitrates access of the second processor to the plurality of memory banks.

3. The device of claim 1, wherein at least one second port further comprises a function controller having a plurality of registers, the function controller controlling the second ports.

4. The device of claim 3, wherein said plurality of registers comprise registers selected from the group comprising control registers, status registers, and test registers.

5. The device of claim 3, wherein said at least one function controller further comprises an interface to at least one pipeline stage of said first processor.

6. The device of claim 1, wherein the memory interface further comprises a crossbar adapted for data communication between each of the plurality of first ports and each of the plurality of second ports.

7. The device of claim 6, wherein said crossbar permits simultaneous access to the plurality of first ports by the plurality of macro functions via the plurality of second ports.

8. The device of claim 1, wherein said second processor comprises a digital signal processor, said digital signal processor being optimized for calculation based on at least one predetermined algorithm.

9. The device of claim 1, wherein said second processor comprises an application specific integrated circuit (ASIC).

10. A method of accessing data disposed within a plurality of memory banks, comprising:

decoding instructions in an instruction decode stage of a first processor, the first processor being associated with a RISC instruction set and the instructions decoded in the instruction decode stage of the processor being extensions of the RISC instruction set;
controlling a second processor comprising a plurality of macro functions by the decoded instructions;
accessing a memory bank, by a macro function of the second processor via a memory interface between the second processor and the plurality of memory banks, responsive to receiving a decoded instruction of the decoded instructions; and
accessing the memory bank, by another macro function of the second processor via the memory interface, responsive to receiving another decoded instruction of the decoded instructions.

11. The method of claim 10, further comprising arbitrating access between the plurality of macro functions and the plurality of memory banks using a crossbar.

12. The method of claim 10, wherein controlling the second processor comprises initiating at least one of said macro functions using an instruction decoded in the instruction decode stage of the first processor.

13. The method of claim 12, wherein controlling the second processor further comprises controlling at least one of said macro functions based at least in part on one immediate operand derived from said decoded instruction.

14. The method of claim 10, wherein controlling the second processor comprises accessing at least one extension register resident within said first processor.

15. The device of claim 1, wherein the first processor is an extensible RISC based processor.

16. The device of claim 1, wherein the plurality of macro functions are configured to process the accessed data in pipeline fashion.

17. The device of claim 1, wherein the macro functions are configured to access the data stored in the memory array via the memory interface based on at least one of an extension register of the first processor or an instruction operand of an instruction decoded in the instruction decode stage of the first processor.

18. The device of claim 1, wherein the instructions control at least one of the macro functions by initiating the macro function.

19. The device of claim 1, wherein the instructions control at least one of the macro functions based on at least one immediate operand derived from the decoded instructions.

20. The method of claim 10, further comprising simultaneously accessing the data disposed in the memory banks from the plurality of macro functions.

21. The method of claim 10, wherein decoding instructions in an instruction decode stage of a first processor comprises decoding instructions in an instruction decode stage of an extensible RISC based processor.

22. The method of claim 10, further comprising processing the accessed data in pipeline fashion with the plurality of macro functions.

23. A processing device, comprising:
a first processor that is an extensible RISC based processor associated with a RISC instruction set, the first processor including an instruction decode stage for decoding instructions that are extensions of the RISC instruction set;
a memory interface having a plurality of first ports and a plurality of second ports;

a memory array having a plurality of memory banks to store data, each memory bank operatively coupled to a first port of the plurality of first ports;

a second processor structured to include a plurality of macro functions, each macro function operatively coupled to a second port of the plurality of second ports;

wherein at least two of the macro functions access, in response to the instructions decoded in the instruction decode stage of the first processor, a same memory bank of the plurality of memory banks via one of the first ports associated with the same memory bank and via respective second ports associated with the at least two macro functions.

* * * * *